(12) United States Patent
Azaroff

(10) Patent No.: US 10,796,017 B1
(45) Date of Patent: Oct. 6, 2020

(54) ENTERPRISE VALIDATION PROCESS (EVP)

(71) Applicant: HM Health Solutions Inc., Pittsburgh, PA (US)

(72) Inventor: Andre K. Azaroff, Mount Joy, PA (US)

(73) Assignee: HM Health Solutions Inc., Pittsburgh, PA (US)

(*) Notice: Subject to any disclaimer, the term of this patent is extended or adjusted under 35 U.S.C. 154(b) by 444 days.

(21) Appl. No.: 15/673,461

(22) Filed: Aug. 10, 2017

Related U.S. Application Data

(60) Provisional application No. 62/373,000, filed on Aug. 10, 2016.

(51) Int. Cl.
*G06F 21/62* (2013.01)
*H04L 29/06* (2006.01)

(52) U.S. Cl.
CPC ........ *G06F 21/6245* (2013.01); *H04L 63/083* (2013.01); *H04L 63/0853* (2013.01); *H04L 63/0884* (2013.01)

(58) Field of Classification Search
CPC ............. G06F 21/6245; H04L 63/0853; H04L 63/0884; H04L 63/083
See application file for complete search history.

(56) References Cited

U.S. PATENT DOCUMENTS

| | | | |
|---|---|---|---|
| 6,453,353 B1* | 9/2002 | Win | G06F 21/604 709/225 |
| 2006/0026156 A1* | 2/2006 | Zuleba | G16H 10/60 |
| 2013/0198838 A1* | 8/2013 | Schmidt | H04L 9/3265 726/22 |
| 2014/0222684 A1* | 8/2014 | Felsher | G06Q 30/0283 705/50 |
| 2014/0283061 A1* | 9/2014 | Quinlan | H04L 63/1441 726/23 |
| 2015/0149362 A1* | 5/2015 | Baum | G16H 10/60 705/51 |
| 2015/0379198 A1* | 12/2015 | Tambasco, Jr. | G16H 10/60 705/3 |
| 2017/0006010 A1* | 1/2017 | Miu | G06Q 20/4016 |

* cited by examiner

*Primary Examiner* — Matthew Smithers
*Assistant Examiner* — Mirza Israr Javed
(74) *Attorney, Agent, or Firm* — Michael D. Lazzara; Leech Tishman Fuscaldo & Lampl

(57) ABSTRACT

A computer-implemented method is provided for communicating authorized data to a destination computer system. The method may include receiving a data transmission including a data stream; introspecting the data stream to find at least one identifier; matching the located identifier with at least one validation profile; retrieving one reference data set from the matched validation profile; parsing a portion of the data stream to extract at least one key piece of information; and validating the key piece of information extracted from the data stream against the retrieved reference data sets to determine the existence of mismatched data. Validated data can then be communicated to the destination system as authorized data.

19 Claims, 3 Drawing Sheets

ENTERPRISE VALIDATION PROCESS (EVP)

CROSS-REFERENCE TO RELATED APPLICATION

The present application claims priority to U.S. Provisional Patent Application Ser. No. 62/373,000 filed on Aug. 10, 2016, the entirety of which is hereby incorporated by reference into the present application.

FIELD OF THE INVENTION

Various embodiments of computer-implemented tools and techniques are provided for validating data for transmission to an authorized destination computer system. In certain embodiments, data transmission can be terminated if mismatched data or other error conditions are detected.

BACKGROUND

Computer systems are an essential component for the successful operation of any business entity or enterprise which relies on effectively and efficiently processing, analyzing, or managing data. However, protecting the security and privacy of data in computer systems, while ensuring only valid data is communicated to the correct destination (and no other destinations), can be a daunting task. For example, data destinations A and B may both be authorized to receive social security number (SSN) information, but A may not be entitled to receive or view B's data, and vice versa. Also, it is critical to validate that data communicated to a destination is correct and valid and does not contain unnecessary extra or improper information.

What are needed, therefore, are enhanced tools, techniques, and computer framework elements which can effectively analyze or scan data prior to its communication to a destination system to promote secure transfer of correct data. In contrast to other conventionally available technology, the analysis should be executed in substantially real time or near real time, so that the transmission can be readily terminated if unauthorized or incorrect information is detected in a data file. Also, tools are needed that can leverage dynamic reference data for the analysis, which are generated and applied based on the type of data to be transmitted and the selected destination system.

SUMMARY

In various embodiments, enhanced computer-implemented tools, techniques, and computer architecture are provided for analyzing and validating data prior to its communication to a destination system to promote secure transfer of correct and authorized data. The data transmission can be readily terminated if unauthorized or incorrect information is detected in a data file. Also, these tools and techniques can leverage dynamic reference data sets in connection with performing the analysis. The reference data sets can be generated and applied based on the type of data to be transmitted and the selected destination system.

Those skilled in the art will appreciate that various tools, techniques, and solutions described herein are rooted in a computer-based environment. These solutions can enhance the computing efficiency and effectiveness of the computer architectures in which they are implemented. They can provide, among other things, enhanced data processing and more efficient use of hardware and software resources within the overall computer system.

In one embodiment, a computer-implemented method is provided for communicating authorized data from a first computer system having a processor and at least one data storage medium to a destination computer system. The method may include: receiving a data transmission including at least one data stream; introspecting the data stream to find at least one identifier; matching the located identifier with at least one validation profile; retrieving at least one reference data set from the matched validation profile; parsing at least a portion of the data stream to extract at least one key piece of information; and validating, by the processor, the key piece of information extracted from the data stream against the retrieved reference data sets to determine the existence of mismatched data. In certain aspects, the identifier may include a file name or an XML tag, for example. The data stream may include, for example, personally identifiable information or healthcare information, among other types of sensitive or confidential information.

In certain aspects, the validation profile can be used for parsing the data stream and for validating the key piece of information extracted from the data stream. At least one reference data set may comprise an inclusion data set including allowed values, and another reference data set may comprise an exclusion data set including denied values. The method may involve terminating the data transmission to the destination system when validating the key piece of information extracted from the data stream against the retrieved reference determines the existence of mismatched data (e.g., a value not contained in an inclusion reference data set, or a value contained in an exclusion reference data set). Alternatively, the method may include communicating a validated data file to the destination system when validating the key piece of information extracted from the data stream against the retrieved reference determines the existence of no mismatched data.

In other aspects, the validation profile may include one or more configurations which define how the reference data sets are to be generated. The reference data sets may be generated independently from the data stream using one or more authoritative systems of record.

In certain aspects, terminating the data transmission to the destination system may occur when an error condition is detected. The error condition may involve detecting the absence of the validation profile, detecting an inability to introspect the data stream to find the identifier, detecting an inability to match the located identifier with at least one validation profile, detecting an inability to generate one or more reference data sets specified in the validation profile, or other types of error conditions.

In certain embodiments, the data stream may be received and processed by a computer system comprising a validating proxy or a server, for example, among other types of computer architecture implementations.

DETAILED DESCRIPTION

Various embodiments of computer-executed processes, systems, components, and tools may be referred to herein at times as "enterprise validation process" (or "EVP") related technology. In developing the present invention, the inventor has acknowledged that EVP is a solution that promotes transfer of outbound data which contains only information which external entities are authorized or entitled to receive. The EVP tool may be configured not only to scan for a type of data (e.g., SSN data), but also applies context to the data to further differentiate access levels. In the example mentioned above, data recipients A and B both can receive SSN numbers, but A is not allowed to view B's numbers and vice versa. By introspecting the data stream and applying context to the data, the EVP tool can promote communicating only proper SSN data to A and B, and also sending only the SSN data to A which is authorized to be seen by A, as well as sending only the SSN data to B which is allowed to be seen by B.

The basis for ensuring that data is appropriate or valid can involve employing an inclusion or exclusion reference set. These reference data sets may include a master list of valid values (inclusion) or invalid values (exclusion) possible for a given field in a given data set. The profile can be embodied as one or more configurations which define how the reference sets are generated, and data parsed from each target data record can be tested against the reference set of data to check accuracy or validity of the data. In certain embodiments, because the reference data set is generated independently from the content of the communicated data using one or more systems of record (which can be deemed an authoritative source), the process is comparatively more reliable than other methods.

Figure 1:
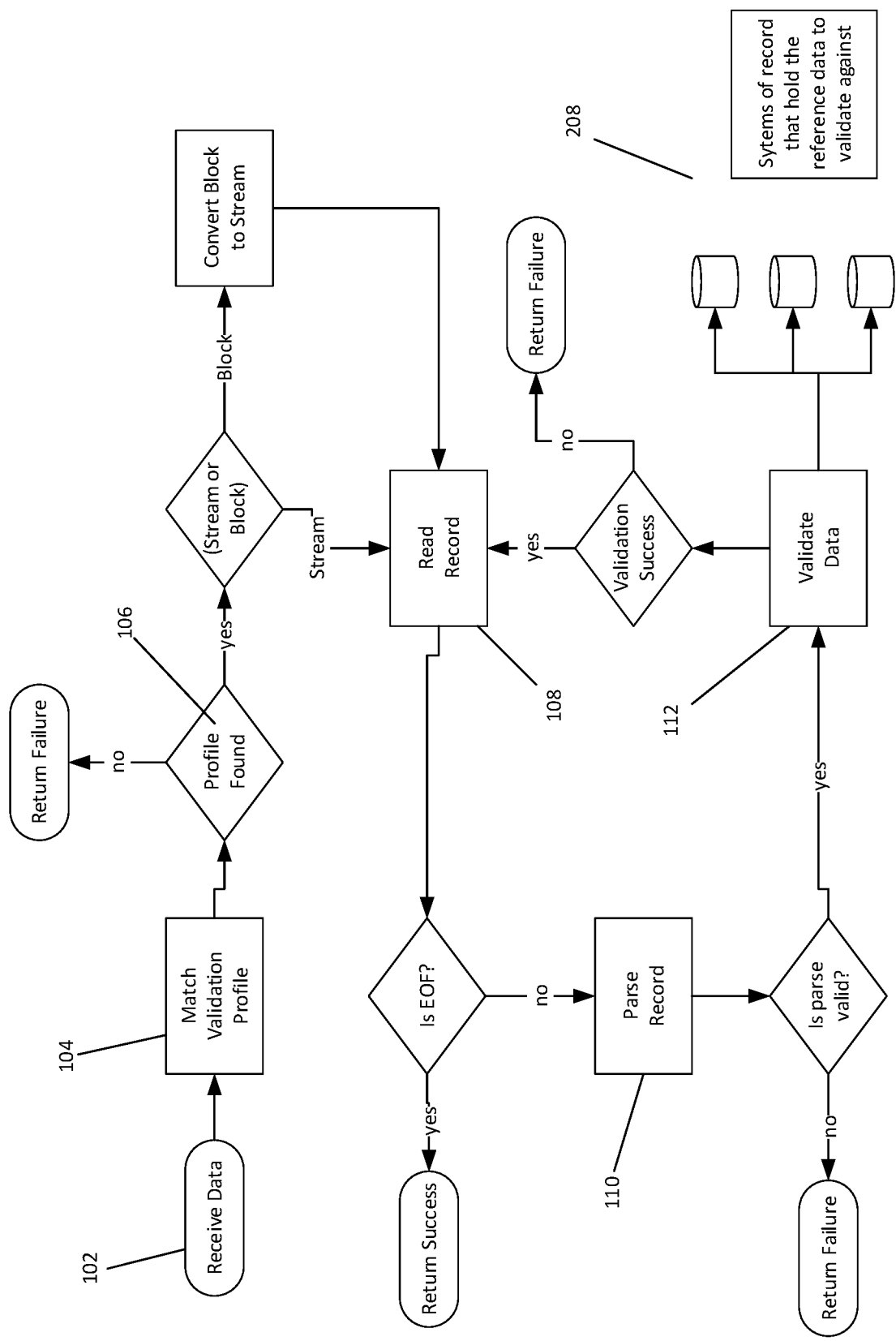
FIG. 1 includes examples of different aspects of a computer architecture and a process flow for implementing a security scan tool and an authenticated data communication process in accordance with certain embodiments of the invention.
Figure 2:
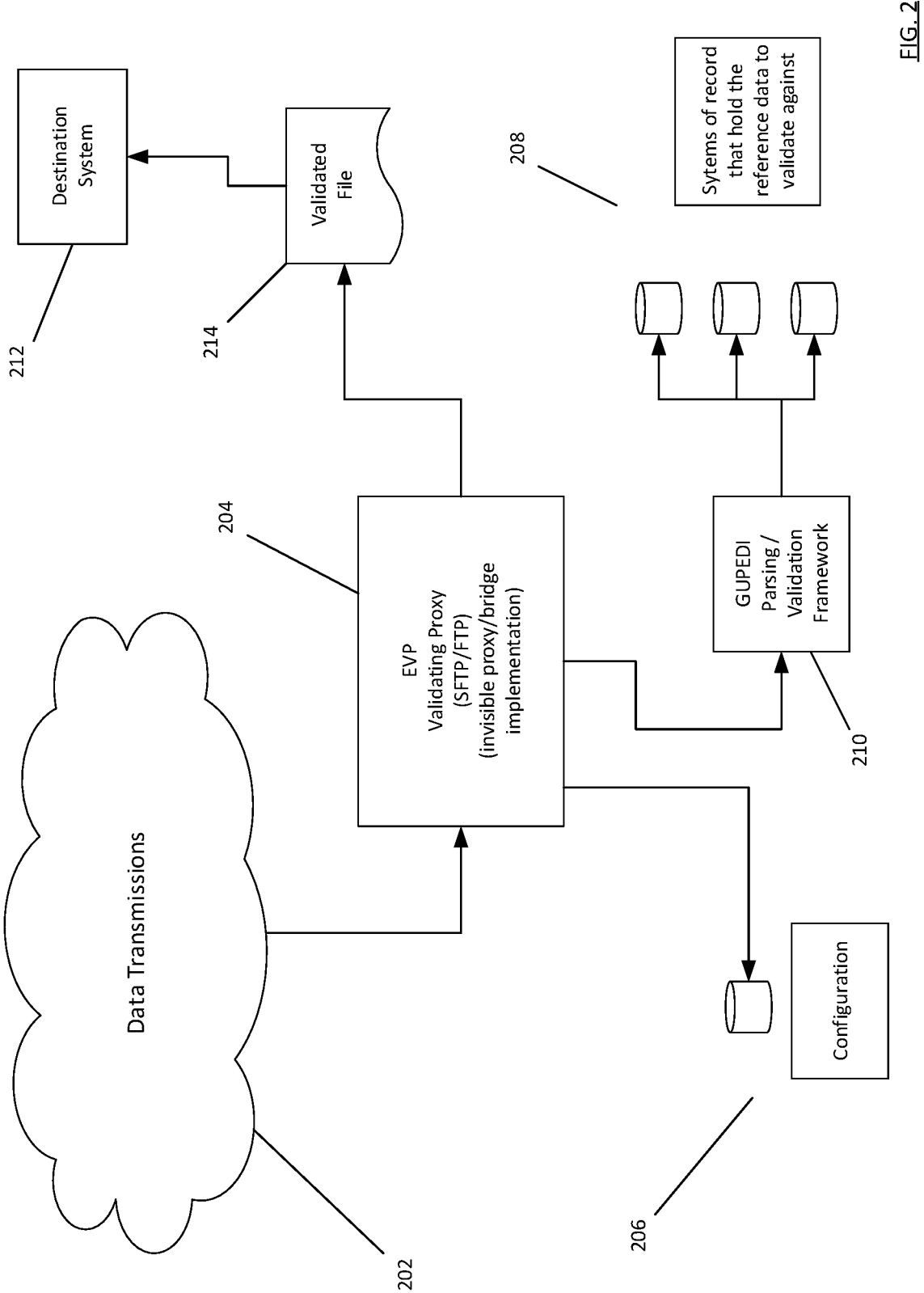
FIG. 2 includes examples of different aspects of a computer architecture and a process flow for implementing a security scan tool and an authenticated data communication process in accordance with certain embodiments of the invention.

With reference to FIGS. 1 and 2, examples are provided of computer architecture and a process flow for implementing a security scan tool structured in accordance with certain embodiments of the invention. At step 102, one or more data transmissions 202 are communicated and received by an EVP validating proxy 204 programmed to perform a security scan on the communicated data. At step 104, the type and structure of the data is identified by introspecting the data stream to find an identifier. The identifier can be a file name, XML tag, etc., that allows the security scan tool to match a validation profile or set of configurations 206 to the received data 202 at step 106. The validation profile 206 can be configured to specify how to handle parsing and validating the communicated data transmissions 202.

At step 108, the identified profile 206 can be read and one or more sets of reference data can be retrieved, which can be derived from one or more systems of record 208 which store the reference data sets. These reference data sets can either be inclusion (allowed values) or exclusion (denied values).

At step 110, the tool may parse the data stream and extract one or more key pieces of information to be validated. The parsing performed at step 110 may be enabled through a GUPEDI parsing or validation framework 210 (see attached Section C), for example, or another suitable data parsing framework. At step 112, the key pieces of information obtained from step 110 can be validated against their respective reference sets. If there is a mismatch (e.g., a value not contained in an inclusion set, or a value contained in an exclusion set), an exception can be triggered and communication or transmission of the data to the intended destination system 212 (or systems) can be terminated. Otherwise, if no mismatch or other error is detected, then a validated file 214 can be communicated to the destination system 212.

If anything is amiss or an error condition arises at various stages of this process, including detecting the absence of the validation profile, for example, then the data transmission can be terminated. Examples of error conditions include, without limitation, inability to introspect the file to determine the identifier; inability to find a profile related to the identifier; inability to generate one or more reference sets specified in the profile; inability to parse data to extract identifiers for validation; and/or inability to validate the data prior to transmission to a destination system.

Figure 3:
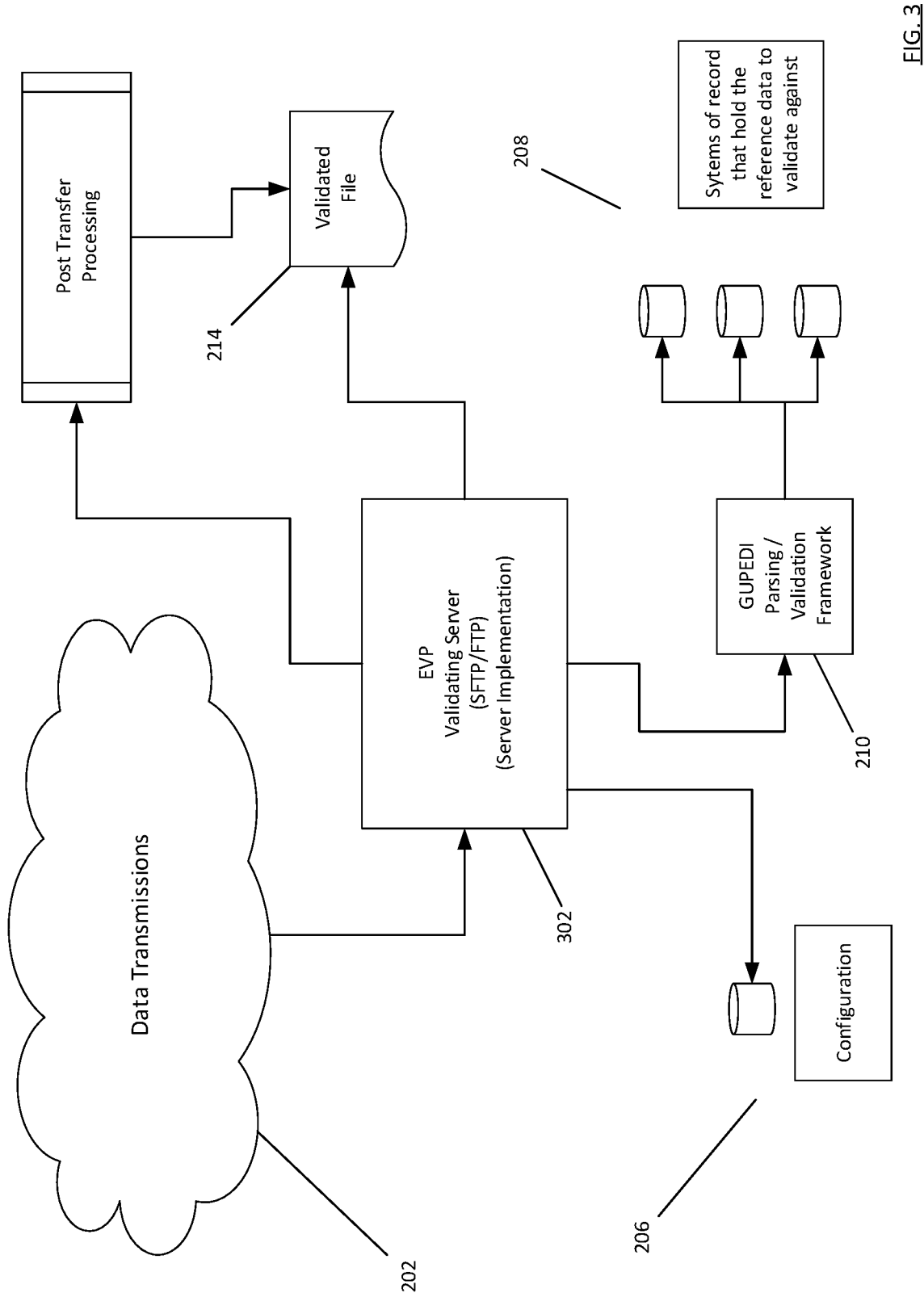
FIG. 3 includes examples of different aspects of a computer architecture and a process flow for implementing a security scan tool and an authenticated data communication process in accordance with certain embodiments of the invention.

In various embodiments, the EVP tool and process can be implemented within different types of computer architecture. As shown in FIG. 2, an invisible proxy/bridge implementation 204 can be configured to handle various protocols (e.g., http, ftp, sftp, and others). Alternatively, as shown in FIG. 3, a server 302 implementation can be provided instead. The proxy implementation 204 can be configured as a standard proxy arrangement with data traffic routed therethrough by operatively associating the proxy 204 with different applications which generate or transmit the data. The server implementation 302 can be provided in those situations where a proxy implementation 204 may not be as useful or desirable to the user.

In various embodiments, creating a validation profile may involve defining the overall format of the entire document. This includes the data format (e.g., xml, fixed record, delimited, etc.), as well as relevant headers/footers, pagination, etc. Also, the structure of the records can be defined including the location, size, data type, etc., of the data fields which need to be validated. Also, the type of validator can be defined, as well as the method to generate the reference data set for each field being validated.

In the examples described herein, configurations can be entered in a hierarchical manner where the configuration name is a compound key with each element separated by a period ("."). Each entry can start with the data identifier that is analyzed during file introspection. For purposes of illustration, the term "ExampleFile" is used herein in various use cases or example scenarios as an example of an identifier.

In one example, standard fixed format files are typical fixed width formatted file that can be translated to a COBOL copy book, for example. The data fields are located at a fixed byte offset from the beginning of a record and each record typically is separated by an EOL character. This is a typical flat file format widely used in data interchange. Each document or set of data that is processed has a profile or a set of configurations that define the contents and structure of the document. Each document—although different—may contain the same basic structural elements (see list below). Note that not all configurations may be necessary as most have default values that are the most common, such as header/footer line counts which are usually designated with a "1" if used. If no default is noted, then the configuration can be used:

1. usesHeader—true if the document has a header. defaults to false
2. headerLineCount—the number of lines in each header. defaults to 1
3. usesFooter—true if the document has a footer. Defaults to false.

4. footerLineCount—the number of lines in the footer. Defaults to 1.
5. pageLineCount—the number of lines in each page including header and footer. Set to zero or omit if there is no pagination. Defaults to 0 (zero).
6. structureName—the name of the structure used to parse the records for the identifiers
7. regularExpression—the regular expression used to match the profile to the data
8. usesEol—false if there is no EOL (end of record/end of line) character in the file. defaults to true.
9. endOfRecord—the character(s) used to signify the EOL. Defaults to CR/LF.
10. dataHandlerClass—the name of the class used to handle the data stream. If omitted will use default handler.
11. parserClass—the name of the class used to parse the data. if omitted will default to the edi parser.

The following is an example of the configurations necessary for a document with one header record, one footer record, and a record structure (MidStructure_20_42) that defines the location of a mID (member identifier) to be validated:

ExampleFile.regularExpression=ExampleFile (\d{8})\.txt
ExampleFile.usesFooter=true
ExampleFile.structureName=MidStructure_20_42
ExampleFile.usesHeader=true Note that several configurations have been omitted (e.g., data handler, parser, usesEol, endOfRecord, header and footer line count), so default values are used.

In addition to the document definition, a set of configurations can be entered to define the validations that will take place against each record. The validations come in two types, a bypass and a validation. The bypass can test a field for a value that indicates the record will not be validated. The validation tests the data for validity. There are several configurations for the validation listed below. None of these have defaults because there is no way of knowing prior to determining what the content is. Some are not required and some are conditional based on the type of components being used. The configurations for a bypass and a validation may be identical except for the root key element which has either a "bypass" or "validation" designation. The system supports N number of bypass/validation steps for each record which is expressed by the second key element as an integer number that defines the order:

1. isInclusion—defines whether the operation is an inclusion or exclusion test. Defaults to inclusion
2. validatorClass—defines the implementation class that implements the GUPEDI validation interface. Currently there is only one which is com.highmark.gupedi.validators.SetValidator
3. valueKey—the name of the field (as extracted by the EDI parser) who's data will be used for the validation. This can be a compound key by entering a plus sign (+) separated set of field names, e.g., field1+field2+field23
4. setGenerator—defines the way the set is generated. This entry has several sub entries based on the type of generator being used. currently there are 3 set generators with the following configurations
   a. ValueSetGenerator—this generator takes a set of values from entries in this profile. the type of data must be specified if it is anything other than String.
      i. className—the name of the implementation class which must be com.highmark.gupedi.validators.setgenerators.ValueSetGenerator
      ii. type—the data type to convert the value entries to. defaults to String.
      iii. values—this entry has N number of sub entries specified by integers, one for each value that go into the validation set.
         1. 1—first entry
         2. 2—second entry
   b. MultiStageDatabaseSetGenerator—this generator will run a cascading set of sql queries and will cascade results from a query to the subsequent query as a filter. The following configurations are necessary for this set generator:
      i. className—the name of the implementation class which must be com.highmark.validators.setgenerators.MultiStageDatabaseSetGenerator
      ii. stage—this configuration has several sub entries for each stage. A stage is uniquely identified by a second key element which is an integer that defines the order in which the stages are executed.
         1. dataSource—the data source name that identifies the database to execute the query against.
         2. query—the query to run for this stage. If there are more than 1 queries the second and subsequent queries must use the question mark (?) as a place holder to substitute the results of the previous stage.
         3. blockSize—this governs the number of results that will be substituted for the "?" in subsequent stages. If a query returns too many results some systems will not handle the length of the query statement.
   c. DataServiceSetGenerator—this set generator allows for very complex transactions to be run to generate the reference set. Any type of protocol can be accessed (REST, SOAP, JMS, etc.) and results from multiple sources can be combined arbitrarily (or with custom business logic in the form of a plugin) to generate the reference data. There are very few configurations listed here, for a complete set see the GUPDAF configuration guide.
      i. className—the name of the implementation class which must be com.highmark.validators.setgenerators.DataServiceSetGenerator
      ii. transactionFactoryName—this is the reference name for the transaction factory.
      iii. queryId—the name/identifier of the transaction to be run The following is an example of a bypass and validation for the ExampleFile profile:

ExampleFile.bypass.1.isInclusion=false
ExampleFile.bypass.1.setGenerator.className=com.highmark.gupedi.validators.setgenerators.ValueSetGenerator
ExampleFile.bypass.1.setGenerator.type=java.lang.String
ExampleFile.bypass.1.setGenerator.values.1=/
ExampleFile.bypass.1.validatorClass=com.highmark.gupedi.validators.SetValidator
ExampleFile.bypass.1.valueKey=RecordTypeIndicator1
ExampleFile.bypass.2.isInclusion-true
ExampleFile.bypass.2.setGenerator.className=com.highmark.gupedi.validators.setgenerators.ValueSetGenerator
ExampleFile.bypass.2.setGenerator.type=java.lang.String
ExampleFile.bypass.2.setGenerator.values.1=135
ExampleFile.bypass.2.validatorClass=com.highmark.gupedi.validators.SetValidator ExampleFile.bypass.2.valueKey=RecordTypeIndicator2
ExampleFile.validation.1.isInclusion=true
ExampleFile.validation.1.setGenerator.className=
  com.highmark.gupedi.validators.setgenerators.Multi-
StageDatabaseSetGenerator
ExampleFile.validation.1.setGenerator.stage.1.data
  Source=myDataSource
ExampleFile.validation.1.setGenerator.stage.1.
  query=select mID from memberInfo where ownerId=14
ExampleFile.validation.1.validatorClass=com.
  highmark.gupedi.validators.SetValidator
ExampleFile.validation.1.valueKey=mIDField The above two bypass tests are set up to look at RecordTypeIndicator1 and if it is anything but the "/" character or RecordTypeIndicator2 has a value of 135, then skip the record. A single validation is also set up to validate the mIDField against a set of mID numbers mined from the memberInfo table in a database whose ownerID is equal to 14.

After the document is defined, then the record structure can be defined. Defining the record structure can be done using the standard EDI structure definitions found in more detail in the GUPEDI configuration guide (see attached Section D). For each structure the following configurations can be used. Note that each structure type has different configurations (for a list of examples of configurations for different structures see Section D). The following is for a typical EDI fixed record formatted structure:

1. type—the type of component. This will always be Structure for an EDI structure.
2. style—the style of the data layout. Currently this is fixed or delimited
3. name—this is the name of the structure that is used as a reference for this component.
4. XX—this is a reference to an individual field in the structure. The XX is replaced by a number. The fields are ordered by the numeric sequence in ascending order.

Below is an example configuration for a typical structure. The structure is 426 characters long and contains a mID at position 20:
  type=Structure
  style=fixed
  name=MidStructure_20_42
  5=RecordTypeIndicator1
  10=RecordTypeIndicator2
  15=Filler15
  20=mID_Field
  30=filler14

Unique identification properties, such as individual fields in the record, can be defined. This can be done using standard EDI field definitions that can be found in more detail in the GUPEDI configuration guide. The list below provides a brief overview of configurations which may be used for each field. Note that there is a special field named fillerXX where the XX is the length of the data. The filler is a skip directive and can make record definition much easier. Note that each field type has different configurations (for a list of examples of configurations for different structures see Section D). The following example is for a typical EDI string field which is used for the mID in the above example:

1. type—the type of field. currently there are three types: String, Date, Number
2. className—the name of the implementation class for the data.
3. length—the length of the data
4. name—the name of this component. This should be unique within this structure.
5. padStyle—the padding style. This can have three values, −1 left pad, 0 no padding, 1 right pad. If set to 0 (no padding) the padCharacter configuration is not required and is ignored if provided.
6. padCharacter—the character to use when the data is shorter than the rendered length to pad the string representation.

Below is a sample configuration for the mID_Field identifier field for the above structure:
  type=String
  className=java.lang.String
  name=mID_Field
  length=9
  padStyle=0

Next is a sample configuration for the RecordTypeIndicator1:
  type=String
  className=java.lang.String
  name=RecordTypeIndicator1
  length=1
  padStyle=0

And finally an example of the RecordTypeIndicator2:
  type=String
  className=java.lang.String
  name=RecordTypeIndicator2
  length=3
  padStyle=0

Note that the padCharacter is not specified in this example because the padStyle on the above is set to 0 (no padding) because each field will always be the specified length.

In certain embodiments, the files may be in standard XML format. The structure can be defined using a schema/xsd which helps but is not mandatory. Each record is expected be defined by a tag whose children hold the data. Nested tags are supported by using the tag names (or indexes) in a dot notation (x.y.z).

As noted above, each document or set of data that is processed has a profile or a set of configurations that define the contents and structure of the document. Those skilled in the art will appreciate that XML is fairly well defined and uses tag pairs to define and encapsulate sets of data. Even though the data structures can be more complex than the above flat file scenario, the configurations necessary can be fewer, requiring only the recordTag and dataTags/dataIndexes to define the actual document. Here is a list of examples of the possible configurations for XML:

1. keySource—the source for the name of the fields. This can be either tag or index. if it is set to tag then the names of the tags will be used. if it is set to index the integer index of the tag from its parent is used. if it is set to both then 2 entries are made for each element, 1 with the tag name and one with the tag index.
2. parserClass—the class name of the parser being used. for XML files this must be set to com.highmark.gupssh.validator.XmlParser
3. recordTag—the name of the tag that encloses the record that needs to be parsed.
4. regularExpression—the regular expression to match to the file name.
5. dataTags—a comma separated list of tag names that will be parsed out of the structure. if keySource is set to tag or both and this is omitted it defaults to all.
6. dataIndexes—a comma separated list of all indexes that will be parsed out of the structure, if keySource is set to index or both and this is omitted it defaults to all.

The following is an example of a configuration for an XML document that uses the tag names for the field data references. The root tag for the records to be parsed is DetailRecord:

xmlTest.keySource=tagName
    xmlTest.parserClass=com.highmark.gupssh.
       validator.XmlParser
    xmlTest.recordTag=DetailRecord
    xmlTest.regularExpression=ecs_cncl_ltr_mn\.
       DYYMMDD_THHMMSS\.xml In this example note that there are several configurations omitted (dataTags, dataIndexes), so the default values are used.

Validations can be defined for XML in a substantially similar manner as for the fixed file described above. The following is an example configuration for the validation of the XML file:

xmlTest.validation.1.setGenerator.className=com.
       highmark.gupedi.validators.setgenerators.ValueSet-
       Generator
    xmlTest.validation.1.setGenerator.values.1=14
    xmlTest.validation.1.validatorClass=com.highmark.
       gupedi.validators.SetValidator
    xmlTest.validation.1.valueKey=DataDifferentiator
    xmlTest.validation.1.setGenerator.type=java.lang.String In the above configuration example there are no bypasses (all records are validated), and only a single validation is set up for the DataDifferentiator tag. Since there is only one possible valid value, the ValueSetGenerator is used.

Delimited format files have data elements that are separated by a specified delimiter. One of the most common is the comma (,) to create a standard CSV file. Other delimiters may include the colon (:) and pipe (|), for example. Regardless of the delimiter character used, the definitions for delimited file format are similar to the above fixed file format (that uses GUPEDI).

The configurations for defining a delimited file are identical to the ones for the fixed file format above. The following is an example of a configuration for a delimited file:

akaUmiTest.endOfRecord=10
    akaUniTest.usesEol=true
    akaUmiTest.regularExpression=302_ProviderRoster_
       2016_05_10_00_50.txt
    akaUmiTest.structureName=akaUmiTest
    akaUmiTest.usesFooter=false
    akaUmiTest.usesHeader=true Note that in this example there are several configurations omitted (e.g., data handler, parser, header and footer line count), so the default values are used.

Validations can be defined in the same manner as for the fixed file (see above). The following is an example of configuration for the validation of the above delimited file:

akaUmiTest.validation.1.isInclusion=true
    akaUmiTest.validation.1.setGenerator.className=
       com.highmark.gupedi.validators.setgenerators.ValueSet-
       Generator
    akaUmiTest.validation.1.setGenerator.type=java.
       lang.String
    akaUmiTest.validation.1.setGenerator.values.
       1=0011223344
    akaUmiTest.validation.1.setGenerator.values.
       2=00112233
    akaUmiTest.validation.1.validatorClass=com.
       highmark.gupedi.validators.SetValidator
    akaUmiTest.validation.1.valueKey=String280

In the above example, a single validation is performed on the String280 field and is tested against a set of two static values.

Record structures can be defined in the same manner as the fixed field format. The following is an example configuration for the delimited structure for the above profile. The structure is 35 elements delimited by a pipe (|) character and the UMI is at position 28 and is held in String280:

type=Structure
    style=fixed
    name=akaUmiTest
    delimiter=\|
    10=delimitedString
    20=delimitedString
    30=delimitedString
    40=delimitedString
    50=delimitedString
    60=delimitedString
    70=delimitedString
    80=delimitedString
    90=delimitedString
    100=delimitedString
    110=delimitedString
    120=delimitedString
    130=delimitedString
    140=delimitedString
    150=delimitedString
    160=delimitedString
    170=delimitedString
    180=delimitedString
    190=delimitedString
    200=delimitedString
    210=delimitedString
    220=delimitedString
    230=delimitedString
    240=delimitedString
    250=delimitedString
    260=delimitedString
    270=delimitedString
    280=String280
    290=delimitedString
    300=delimitedString
    310=delimitedString
    320=delimitedString
    330=delimitedString
    340=delimitedString
    350=delimitedString The definition of the unique ID (or UMI) for a delimited file may be identical to that of the fixed file format. The following is a sample configuration for the delimitedString identifier field for the above structure:

type=String
    className=java.lang.String
    name=delimitedString
    length=0
    padStyle=0

Next is a sample configuration for the String280:

type=String
    className=java.lang.String
    name=String280
    length=0
    padStyle=0

Note that the padCharacter is not specified here, because the padStyle on the above is set to 0 (no padding) because the file is delimited each data element can be of any length.

The following use cases provide examples of different aspects of the use and operation of various embodiments of the security scan tool described herein:

Use Case 1—Standard EDI Fixed Length Record Format—

Given the above example configurations and the sample data provided in Section A (attached hereto), the following is a walkthrough of the operation of the security scan tool:
1. The data transfer request is received and introspected to determine the identifier.
   a. the sftp protocol put request is received. In this case the profile is determined by the file name matching the regular expression of "ExampleFile(\d{8})\.txt". This will match any file name starting with "ExampleFile" followed by 8 digits (any 8 digits but this is meant to be a date in the form of yyyymmdd) followed by ".txt"
   b. the profile is retrieved and the configurations read into the system
   c. if the input is block input then it is converted to a stream to continue
2. The first record is read and parsed providing the following values for the RecordTypeIndicator1=H, RecordTypeIndicator2=245, and Mid_Field="RER01 " (quoted to show the whitespace)
   a. Bypass 1 is applied. The RecordTypeIndicator1 is not a "/" so it is skipped
      i. Since this is the first time this bypass is used the reference set is built at this time by taking the values listed in the configuration
3. The second record is read and parsed providing the following values for the RecordTypeIndicator1=/, RecordTypeIndicator2=135, and Mid_Field=SomeNameS
   a. Bypass 1 is applied. The RecordTypeIndicator1 is a "/" so it continues
   b. Bypass 2 is applied. The RecordTypeIndicator2 is 135 so it is skipped
      i. Since this is the first time this bypass is used the reference set is built at this time by taking the values listed in the configuration
4. The third record is read and parsed providing the following values for the RecordTypeIndicator1=/, RecordTypeIndicator2=100, and Mid_Field=00000001
   a. Bypass 1 is applied. The RecordTypeIndicator1 is a "/" so it continues
   b. Bypass 2 is applied. The RecordTypeIndicator2 is 100 so it continues
   c. Validation 1 is applied. The mID of 444073456 is in the set so it continues
      i. Since this is the first time this bypass is used the reference set is built at this time by connecting to the data source listed and running the query to get the set of all valid mID numbers.
5. The fourth record is read and parsed providing the following values for the RecordTypeIndicator1=T, RecordTypeIndicator2=245, and mID_Field="RER01 " (quoted to show the whitespace)
   a. Bypass 1 is applied. The RecordTypeIndicator1 is not a "/" so it is skipped Steps 2 through 5 can be repeated until all records have been read and processed. If at any time the validation fails (e.g., mID_Field value not contained in the set), then the transmission can be terminated and an error code returned to the caller.

Use Case 2—XML File Configuration—

The following is a walkthrough of an example for an XML data configuration. The sample data and complete configuration set can be found in Section B (see below).

1. The data transfer request is received and introspected to determine the identifier.
   a. the sftp protocol put request is received. In this case the profile is determined by the file name matching the regular expression of "ecs_cncl_ltr_mn\._THHMMSS\.xml". This will only match a file named ecs_cncl_ltr_mn.DYYMMDD_THHMMSS.xml. if this were another protocol besides ftp/sftp then the xml would be introspected and the identifier determined by the root tag, namespace, and xsd/dtd if one is referenced.
   b. the profile is retrieved and the configurations read into the system
   c. if the input is block input then it is converted to a stream to continue
2. The XML stream is read until the open tag whose name matches the configured recordTag value. Once this happens a new object is created to hold all the field data. Each new open tag event after the opening of the record does the following
   a. If the keySource configuration is set to tag or both the name is checked against the list of tags specified in the dataTags configuration. If it is in the list the field value is set on the object using the tag key value as the reference
   b. If the keySourceConfiguration is set to index or both the index is checked against the list of indexes specified in the dataIndexes configuration. If it is in the list, the field value is set on the object using the index key value as the reference.
3. When a close tag event is read it is checked against the value of the recordTag configuration. If it matches, the object is considered complete and since there is no bypass configured it is passed off to the validator, where:
   a. Validation 1 is applied. The DataDifferentiator is 14 so it passes.

Steps 2 and 3 can be repeated until the end of the data stream is reached. If at any time the validation fails (e.g., DataDifferentiator value not contained in the set), then the transmission can be terminated and an error code returned to the caller.

Use Case 3—Delimited File—

Given the example configurations for the delimited file and the sample data provided in Section C, the following is a walkthrough of the operation of the tool:
1. The data transfer request is received and introspected to determine the identifier.
   a. the sftp protocol put request is received. In this case the profile is determined by the file name matching the regular expression of "302_ProviderRoster_2016_05_10_00_50.txt". This will match only the file name 302_ProviderRoster_2016_05_10_00_50.txt.
   b. the profile is retrieved and the configurations read into the system
   c. if the input is block input then it is converted to a stream to continue
2. The first record is read and parsed providing the following value for the String280=00112233
   a. Validation 1 is applied. The UMI of 00112233 is in the set so it continues
      i. Since this is the first time this bypass is used the reference set is built at this time by reading in the values provided in the configuration.

Step 2 may repeat until all records have been read and processed. If at any time the validation fails (e.g., UMI field value not contained in the set), then the transmission can be terminated and an error code returned to the caller.

In various embodiments, the security scan tool may employ a GUPEDI module (see Section D) which can be programmed to provide configuration driven data translation functionality. The GUPEDI module may be programmed to support multiple input types, such as file—fixed length/ delimited (e.g., as a string or input stream/reader); Pojo; and Map, among others. Likewise, the GUPEDI module may be programmed to support multiple output types such as file— fixed length/delimited; Pojo; Map; XML; and JSON, among others. Various illustrative examples of the structure, configuration, and operation of certain aspects of the GUPEDI module can be seen in the description of Section D (see below).

Section A—Use Case 1 Sample Data and Configurations
Sample Data:
    H245RER01
    /135SomeNameSomeLastNameSomeMiddleInitial
    /100000000001
    T245RER01
    H245RER02
    /135SomeNameSomeLastNameSomeMiddleInitial
    /100000000002
    T245RER02
    H245RER03
    /135SomeNameSomeLastNameSomeMiddleInitial
    /100000000003
    T245RER03
    H245RER04
    /135SomeNameSomeLastNameSomeMiddleInitial
    /100000000004
    T245RER04
    H245RER05
    /135SomeNameSomeLastNameSomeMiddleInitial
    /100000000005
    T245RER06
Configurations: there are five configuration sets for the above data. First is the profile which is stored in the ProfileConfigurations.properties:
    ExampleFile.regularExpression=ExampleFile (\d{8})\.txt
    ExampleFile.usesFooter=true
    ExampleFile.structureName=MidStructure_20_42
    ExampleFile.usesHeader=true
    ExampleFile.bypass.1.isInclusion=false
    ExampleFile.bypass.1.setGenerator.className=
        com.highmark.gupedi.validators.setgenerators.Value-
        SetGenerator
    ExampleFile.bypass.1.
        setGenerator.type=java.lang.String
    ExampleFile.bypass.1.setGenerator.values.1=/
    ExampleFile.bypass.1.validatorClass=com.highmark.
        gupedi.validators.SetValidator
    ExampleFile.bypass.1.valueKey=RecordTypeIndicator1
    ExampleFile.bypass.2.isInclusion=true
    ExampleFile.bypass.2.setGenerator.className=com.
        highmark.gupedi.validators.setgenerators.ValueSet-
        Generator
    ExampleFile.bypass.2.setGenerator.type=java.lang.String
    ExampleFile.bypass.2.setGenerator.values.1=135
    ExampleFile.bypass.2.validatorClass=com.highmark.
        gupedi.validators.SetValidator
    ExampleFile.bypass.2.valueKey=RecordTypeIndicator2
    ExampleFile.validation.1.isInclusion=true
    ExampleFile.validation.1.setGenerator.className=
        com.highmark.gupedi.validators.setgenerators.Multi-
        StageDatabaseSetGenerator
    ExampleFile.validation.1.
        setGenerator.stage.1.dataSource=myDataSource
    ExampleFile.validation.1.setGenerator.stage.1.
        query=select mID from memberInfo where ownerId=14
    ExampleFile.validation.1.validatorClass=com.
        highmark.gupedi.validators.SetValidator
    ExampleFile.validation.1.valueKey=mID_Field
The structure definition can be stored in a file named MidStructure_20_42.properties as specified by the ExampleFile.structureName parameter in the above configurations:
    type=Structure
    style=fixed
    name=MidStructure_20_42
    5=RecordTypeIndicator1
    10=RecordTypeIndicator2
    15=Filler15
    20=mID_Field
    30-filler14
Next are the three field definitions referenced in the above structure. First is the RecordTypeIndicator1.properties:
    type=String
    className=java.lang.String
    name=RecordTypeIndicator1
    length=1
    padStyle=0
Next is the RecordTypeIndicator2:
    type=String
    className=java.lang.String
    name=RecordTypeIndicator2
    length=3
    padStyle=0
Finally is the mID_Field:
    type=String
    className=java.lang.String
    name=mID_Field
    length=9
    padStyle=0
Section C—Use Case 2 Sample Data and Configurations
Sample Data:
    <FILE>
        <DetailRecord>
            <PrtDRecordType>D</PrtDRecordType>
            <LetterBrand>M1</LetterBrand>
            <LetterType>CANLTR0016</LetterType>
            <DataDifferentiator>14</DataDifferentiator>
            <UMI>1232664960010</UMI>
            <GroupNumber>10237497</GroupNumber>
            <LetterDate>20160405</LetterDate>
            <Prefix><Prefix>
            <FirstName>Fred</FirstName>
            <Middlename></Middlename>
            <LastName>Flintstone</LastName>
            <Suffix></Suffix>
            <AddressTypeCd>U</AddressTypeCd>
            <Address1>1 Bedrock Way</Address1>
            <Address2></Address2>
            <Address3></Address3>
            <Address4></Address4>
            <City>Rock City</City>
            <State>SA<State>
            <Zip>00000</Zip>
        </DetailRecord>
        <DetailRecord>
            <PrtDRecordType>D</PrtDRecordType>
            <LetterBrand>M1</LetterBrand>

```
    <LetterType>CANLTR0016</LetterType>
    <DataDifferentiator>14</DataDifferentiator>
    <UMI>1232671570010</UMI>
    <GroupNumber>10237497</GroupNumber>
    <LetterDate>20160405</LetterDate>
    <Prefix></Prefix>
    <FirstName>Wilma</FirstName>
    <Middlename></Middlename>
    <LastName>Flintstone</LastName>
    <Suffix></Suffix>
    <AddressTypeCd>U</AddressTypeCd>
    <Address1>1 Bedrock Way</Address1>
    <Address2></Address2>
    <Address3></Address3>
    <Address4></Address4>
    <City>Rock City</City>
    <State>SA</State>
    <Zip>00000</Zip>
  </DetailRecord>
  <DetailRecord>
    <PrtDRecordType>D</PrtDRecordType>
    <LetterBrand>M1</LetterBrand>
    <LetterType>CANLTR0016</LetterType>
    <DataDifferentiator>14</DataDifferentiator>
    <UMI>1232672940010</UMI>
    <GroupNumber>10237496</GroupNumber>
    <LetterDate>20160405</LetterDate>
    <Prefix></Prefix>
    <FirstName>Bruce</FirstName>
    <Middlename></Middlename>
    <LastName>Wayne</LastName>
    <Suffix></Suffix>
    <AddressTypeCd>U</AddressTypeCd>
    <Address1>Gotham Drive</Address1>
    <Address2></Address2>
    <Address3></Address3>
    <Address4></Address4>
    <City>Gotham</City>
    <State>NY</State>
    <Zip>111111</Zip>
  </DetailRecord>
</FILE>
```

Configurations:
  xmlTest.keySource=tagName
  xmlTest.
    parserClass=com.highmark.gupssh.validator.XmlParser
  xmlTest. recordTag=DetailRecord
  xmlTest.
    regularExpression=ecs_cncl_ltr_mn\.DYYMMDD_THHMMSS\.xml
  xmlTest.
    validation.1.setGenerator.className=com.highmark.gupedi.validators.setgenerators.ValueSetGenerator
  xmlTest. validation.1.setGenerator.values.1=14
  xmlTest.
    validation.1.validatorClass=com.highmark.gupedi.validators.SetValidator
  xmlTest.validation.1.valueKey=DataDifferentiator
  xmlTest. validation.1.setGenerator.type=java.lang.String Section C—Use Case 3 Sample Data and Configurations
Sample Data:
  A| GARY| BROTHERSON    10923723
   | 00112233| 20131107| 20161106| 2| 302|
  A| DANIEL| BENCKART    10922949
   | 00112233| 20131105| 20161104| 2| 302|
  A| HUNASAGATTA| NANJUNDASWAMY
       1102587| 00112233| 20131107
   | 20161106| 2| 302|
  A| ANTHONY| OLIVERIO    10933509
   | 00112233| 20131107| 20161106| 2| 302|
  A| TAE| MIN    11916077| 00112233
   | 20131107| 20161106| 2| 302|
  A| GARRY| CONDON    10924939
   | 00112233| 20131105| 20161104| 2| 302|
  A| DOROTHY| CANDIB    11024163
   | 00112233| 20131107| 20161106| 2| 302|
  A| JONATHAN| MCCLURE    10932110
   | 00112233| 20131105| 20161104| 2| 302|
  A| JAMIE| DIANDRETH    11838023
   | 00112233| 20131107| 20161106| 2| 302|
  A| MARY| FLETCHER    11227594
   | 00112233| 20131105| 20161104| 2| 302|
  A| J| SHYMANSKY    10936384
   | 00112233| 20131105| 20161104| 2| 30|
  A| CHARLES| BETTS    10923115
   | 00112233| 20131107| 20161106| 2| 302|
  A| ANGEL| FLORES    10831721
   | 00112233| 20131107| 20161106| 2| 302|
  A| GERALD| GRONBORG    10927999
   | 00112233| 20131107| 20161106| 2| 302|
  A| FREDERICK| LANDENWITSCH
       11025407| 00112233| 20131105
   | 20161104| 2| 302|
  A| BRIAN| CARICATO    11227155
   | 00112233| 20131105| 20161104| 2| 302|
  A| ALLEN| MEYER    10932415| 00112233
   | 19930806| 20160701| 2| 302|
  A| AUGUSTO| FOJAS    10791520
   | 00112233| 20131107| 20161106| 2| 302|
  A| JOHN| OHARA    10933417| 00112233
   | 19930819| 20160701| 2| 302|
  A| GEORGE| POPORAD    10934304
   | 00112233| 19931102| 20160701| 2| 302|

Configurations:
There are four sets of configurations for the above data. Since this is a delimited file each position is configured (see the GUPEDI configuration examples) but the positions from which data is not needed can be reused. The unique field names needed are the ones used for either a bypass or validation. First the profile in ProfileConfigs.properties:
  akaUmiTest.endOfRecord=10
  akaUmiTest.regularExpression=302_ProviderRoster_2016_05_10_00_50.txt
  akaUmiTest.structureName=akaUmiTest
  akaUmiTest.usesFooter=false
  akaUmiTest.usesHeader=true
  akaUmiTest.validation.1.isInclusion=true
  akaUmiTest.validation.1.setGenerator.className=com.highmark.gupedi.validators.setgenerators.ValueSetGenerator
  akaUmiTest.validation.1.setGenerator.type=java.lang.String
  akaUmiTest.validation.1.setGenerator.values.1=0011223344
  akaUmiTest.validation.1.setGenerator.values.2=00112233
  akaUmiTest.validation.1.validatorClass=com.highmark.gupedi.validators.SetValidator
  akaUmiTest.validation.1.valueKey=String280

Second is the structure definition. This is stored in a file named akaUmiTest.properties as specified by the akaUmiTest.structureName parameter in the above configurations:

```
type=Structure
style-fixed
name=akaUmiTest
delimiter=\|
10=delimitedString
20=delimitedString
30=delimitedString
40=delimitedString
50=delimitedString
60=delimitedString
70=delimitedString
80=delimitedString
90=delimitedString
100=delimitedString
110=delimitedString
120=delimitedString
130=delimitedString
140=delimitedString
150=delimitedString
160=delimitedString
170=delimitedString
180=delimitedString
190=delimitedString
200=delimitedString
210=delimitedString
220=delimitedString
230=delimitedString
240=delimitedString
250=delimitedString
260=delimitedString
270=delimitedString
280=String280
290=delimitedString
300=delimitedString
310=delimitedString
320=delimitedString
330=delimitedString
340=delimitedString
350=delimitedString
```

Next are the two field definitions referenced in the above structure. First is the delimitedString field which is housed in the delimitedString.properties file:

```
type=String
className=java.lang.String
name=delimitedString
length=00
padStyle=-0
```

Next is the String280 field which is in the field280.properties file:

```
type=String
className=java.lang.String
name=RecordTypeIndicator2
length=3
padStyle=0
```

Section D—GUPEDI Framework—

EDI Framework Overview—The EDI framework serves as a binding framework for delimited and fixed width data files and POJOs. The framework is completely configurable and the binding takes place automatically based on the configuration files. The framework is able to generate a flat file from a set of POJOs or a set of POJOs from a flat file without any java coding. The default return object is a map for each row so no POJOs are actually required to be created but can be if required. There are three basic components the user is required to understand. The record set, structure and field. Once these are understood configuration is simple.

Record sets represent a collection of records or individual lines or a file. They are comprised of structures. Structures represent an individual record/line and define the makeup of it using fields. Fields represent an individual data element in a structure. There are several types of fields, each with its own properties. Note that a structure may be used as a field.

EDI Framework Configuration Overview—Configuration of the EDI framework requires that there be a number of configuration files created. The number will vary depending on the makeup of the individual record or structure. At a minimum you will have a configuration for the Record set, the record structure and 1-N configuration, one for each data element in the structure. Note that these configurations can be reused in different record set definitions so it can be beneficial to standardize some data elements and reuse them across an entire enterprise. Configurations are stored in standard properties files. The Highmark properties object is used to allow storage of these configurations in a database for convenience.

When referring to component names in the EDI framework it is useful to note that they are referred to in the same way a java class is referred to, using dot-notation of the package structure without any file extension. This is translated by the framework into the correct name so if you had a properties file named "ClientNumber.properties" for the clientNumber component in the "com.highmark.client" package you would refer to the component as "com.highmark.client.ClientNumber" without the extension and without changing the dot "." to a slash "/" as you normally would to retrieve a file resource. This way you can package a resource jar with your components and distribute it to consumers.

A record set is the top level component and represents an entire file of data. The record set configuration contains only 8 configuration parameters:

- type—this is the component type of this configuration and should be set to "recordSet"
- name—this is the name of the record set. This is used internally within the framework to uniquely identify it.
- structureName—this is the fully qualified name of the structure for the body of records (see note about component names above).
- usesHeader—a value of "true" or "false" to indicate whether this structure has a header record or not.
- headerStructure—this is the fully qualified name of the structure used for the header record (see note about component names above). This entry is only required if uses-leader is set to true.
- usesFooter—a value of "true" or "false" to indicate whether this structure has a footer record or not.
- footerStructure—this is the fully qualified name of the structure used for the footer record (see note about component names above). This entry is only required if usesFooter is set to true.
- trailingEOL—a value of "true" or "false" to indicate whether there should be a trailing end of line character as the last character of the file. This is most important for the creation of the flat file from a list of POJOs where the recipient expects that every line will have an EOL character.

It is expected that if either a header of footer (or both) are used there can be only a single record for each of them. Following is an example of a record set definition:

```
type=recordSet
name=mixedSampleRecordSet
structureName=com.company.edistructures.mixed
    SampleStructure
``` useHeader=false
headerStructure=headerStructure
useFooter=false
footerStructure=footerStructure
trailingEOL=false The above configuration defines a record set named "mixedRecordSet" that has no header or footer with a body structure of "com.highmark.gupedi.edistructures.mixedSampleStructure". When a file is written an EOL character will not be appended to the last line of the record set.

Structures are the representation of the rows contained within a record set. A record set is broken down into a series of rows, delimited by an EOL character or character sequence, each of which contains a series of data elements or fields. A structure is the most complex of the components to configure and has a variable number of configuration parameters. There are five standard configurations that should be entered followed by a variable number of field definitions. The five standard configuration parameters are:

- type—the type of component. This should be set to "Structure"
- name—the name of this component. This is used internally by the framework but should be unique within the record set.
- defaultDataObject—this is the fully qualified class name of the POJO that will be created when calling the getValueAsObjectList method without supplying an object type for mapping the structure. If no value is configured and no type supplied the method will return a list of Maps.
- style—a value of "fixed" or "delimited" to indicate the style of field separation for this structure.
- delimiter—the character used as a field delimiter if the style is set to "delimited"

In addition to the above five configurations each structure will contain a number of entries whose keys are all integer numbers and values are the field names (see a note on names above) of the data elements. The integer key value is used to sequence the fields so the lowest number (regardless of location in the file) is the first element in the sequence. The numbers can be any integer (positive or negative). Following is a sample of a structure definition:

type=Structure
style=delimited
delimiter=,
name=SampleStructure
10=com.company.edifielddefs.delimitedString
20=Filler34&#
30=com.company.edifielddefs.Date
40=com.company.edifielddefs.delimitedNumber
50=com.company.edistructures.SampleStructure2

The above configuration defines a structure named "SampleStructure" that is delimited by the "," (comma) character. The structure contains 5 data elements 1 of which (#20) is the special "Filler" field and one of which (#50) is another structure. The other three are standard fields. In the above example, a filler type is used. This is a special type that has no definition. The format of the value is very specific. It has 2 forms a simple form and a complex form. The simple form is the word "Filler" followed by a numeric value that indicates the width of the filler. If this form is used the default filler of a blank space will be used. An example of this would be "Filler23" which would produce a 23 character string of blank spaces. The complex form also contains the character to be used as the filler separated by the "&" symbol. An example of this would be "Filler23&#" which would produce a 23 character long string of the "#" character.

It is possible to use a structure as a field in another structure definition. To do this you simply use the name of the structure definition file instead of a field definition file. The benefit of using a structure as a field is that you can mix and match different delimiter styles on a single line. You could have a delimited format file that contains a field that has fixed width set of values.

Fields are the representations of the individual pieces of data contained in a structure. A field configuration has only 6 configuration parameters:

- type—The data type of this field. Currently the framework supports 3 types—Date, Number and String.
- name—the name of the component. This name is used to access (get/set) the individual data element in a structure. This name should be unique within the structure.
- className—the implementation class of the return type.
- length—the length of the data element in the structure. This configuration only has meaning if the structure is a comprised of fixed width fields. The data element will either be padded or trimmed to the length specified by this parameter.
- padStyle—a value of "−1" for left padding or "1" for right padding.
- padCharacter—this is the character to use for padding the value when it is shorter than the value specified by length. Note that some characters need to be escaped due to the nature of the properties object and how it stores the information. Most notably is the space character—" " as well as any special characters like a tab (\t).

Note that each data type other than string has additional configuration parameters. This may also include any custom data types that are used. The following are the additional parameters listed by data type:

Date—the date type has 2 extra parameters
- dateFormat—the formatting string that should conform to the constraints of the standard java SimpleDateFormat class.
- dateOffset—the offset into the date field that the actual data begins. This value is optional and defaults to zero.

Number—the number type has 2 extra parameters
- Precision—the location of the decimal point in the representation. This is used only used when there is no decimal point provided in the representation (removeFormatting=true).
- removeFormatting—a value of "true" or "false" indicating whether the formatting for the number (currency symbol, decimal, etc.) are rendered in the file output.

Following are examples of configurations for each of the three types of data:

String:
name=customerName
type=String
className=java.lang.String
length=25
padStyle=−1
padCharacter=

The above configuration defines a field named "customerName" that will hold a string 25 characters long that is left padded (right justified) with spaces (note the blank space after the backslash " ")

Number:
name=paymentAmount
type=Number
className=java.lang.Double
length=12
padStyle=−1
padCharacter=0
precision=2
removeFormatting=true The above configuration defines a field named "paymentAmount" that is a number 12 characters wide with a precision of 2. The formatting of the number will be removed when written to the file. The value will be left padded (right justified) with zeros.

Date:
name=startDate
type=Date
className=java.util.Date
length=10
padStyle=1
padCharacter=\
dateFormat=yyyy-MM-dd
dateOffset=0

The above configuration defines a field named "startDate" that is a date that is 10 characters wide and has a format of "yyyy-MM-dd" (in SimpleDateFormat" terms). The offset into the field is zero since the format itself is 10 characters and the padCharacter is defined as a space (note the " "after the backslash "\").

This section outlines the basic usage and initial configuration of the framework—Required Resources and Jar Placement. The following three jars are required:
1. edi.jar
2. gupdafComplete.jar
3. hmkcom.jar—indirect dependency from the data service jars.

These jars may be placed anywhere in the class path. Note that the gupdafComplete.jar and hmkcom.jar contain the interfaces and support classes required and should be available in the class path for both the module interfacing with the data repositories as well as the module that is consuming the data (these could be the same or different modules.) The gupdafComplete.jar is only required to be available to the module that is accessing the data repositories.

Initial configuration starts with a record set configuration. Regardless of the actual structure the basic decisions to use/not use a header and/or footer and the names for the record set and structure can be done at this point and the record set configuration created.

Next a structure should be defined. Use the name from the record set created in the previous step. When creating the structure you should remember to use unique names for each field. If you fail to do so, you may have unexpected results when trying to set data onto the structure.

Once your structure is defined then you need to create a definition for each field defined in the structure in the previous step. Note that you do not have to create any definitions for the filler fields.

Once your configurations have been created, testing your record set is fairly simple. You can test each component individually or you can do an end-to-end test. Just remember that a test on a record set or structure by extension tests the ancestors it has configured. It will not do a full set of tests but it will test the basic get/set/convert operations.

Following is a sample of how to use the framework. Several examples are given. This example reads the string from a file. Any input stream will suffice.

InputStream is =ClassLoader.getSystemResourceAsStream("tabTestData.txt");
EDIRecordSet recordSet=null;
recordSet=(EDIRecordSet)
EDIComponentFactory.createComponent("com.company.edirecordsets.tabSampleRecordSet",−1);
recordSet.parseRecordSet(is);

Extracting the data—To return the raw data there is a standard getValue( ) method that returns a list of EDIStructure objects. This is the default representation of the data.
List<EDIStructure> records=recordSet.getValue( );

To return the data into the various formats use the getValueAs . . . methods. The following methods return a string representation in various formats.
System.out.println("the record set is:\n"+recordSet.getValueAsString( ));
System.out.println("the record set xml is:"+recordSet.getValueAsXml( ));
System.out.println("the record set json is:"+recordSet.getValueAsJson( ));

The following return a list of objects that can then be iterated over.
List<Object> records=recordSet.getValueAsObjectList( );
List<Type> records=recordSet.getValueAsObjectList(type);

Note that the first form retrieves a list of objects the type of which is specified in the configuration. The second form accepts an object and the framework will try to convert the set into a list of that object type.

Once the data is read in you can manipulate it by iterating over the record sets and getting/setting individual field values.
Set<EDIStructure> structureSet=(Set)recordSet.getValue();
for (EDIStructure struct:structureSet) {
struct.setFieldValue("String", "another test value.");
struct.setFieldValue("Date", new java.util.Date( ));
struct.setFieldValue("Number", new Double("35.01"));
String str=struct.getFieldValue("String");
}

Using Complex Components as Fields—Every component that implements the EDIFieldInterface (which is every component in the framework) may be used in a structure as a field. This allows for very complex data structures. It is possible to have a record set or structure defined as a field in another structure. Be careful though as some structures don't lend themselves very well to nesting.

Data Formats and Bi-Directional conversions—The framework supports several data input and output formats. Data supplied in any of the input formats can be converted to any of the output formats. This allows for seamless and easy conversions between types. There are five input types:
1. Input Stream—The input stream is used to read from file(s) etc. It treats the data the same way as described in the String type below. The input stream uses the parse method as opposed to the setData method.
2. String—The string type is representative of a flat fixed or value separated data format. One entire string is used to represent a record set. The standard CR-LF/EOL line separator is the expected record termination.
3. List<EDIStructure>—The list of native structures.
4. List<Map>—The List of maps uses each map to represent a single record. The key values in the map should match the name (including case) of a configured field. Non-matching keys will be ignored.

5. List<pojo>—The list of pojos uses each pojo to represent a single record. The attribute names should match exactly (including case) the name of a configured field. Non-matching attributes will be ignored.

There are five output types:
1. String—The string type is representative of a flat fixed or value separated data format. One entire string is used to represent a record set. The standard CR-LF/EOL line separator is the expected record termination.
2. List<Map>—The List of maps uses each map to represent a single record. The key values in the map should match the name (including case) of a configured field. Non-matching keys will be ignored.
3. List<pojo>—The list of pojos uses each pojo to represent a single record. The attribute names should match exactly (including case) the name of a configured field. Non-matching attributes will be ignored.
4. Xml—This is a custom output type that renders the exact structure of the record set as xml. The wrapper tag name for the entire data set and each record come from the configured name of the component. The tag name for each field is also the configured name of the field.
5. Json—This is a custom output type that renders the exact structure of the record set as Json. Attribute names including data block and list names come from the configured name for the component being rendered.

Section E—Data Access Framework. The data access framework sets out to simplify for the developer the details of data access by providing a simple, easy to use interface that encapsulates best practices by forcing the developer to think in terms of units of work. By providing a set of abstractions to represent the building blocks of a coherent unit of work, it promotes the cleanest and most efficient method of access with the least amount of resource consumption. The most relevant components are the data service, component factories, adapters, object processors, request, response, and transaction proxies. The configuration of each will be covered in this document.

Component factories are classes that provide the lookup and/or creation of the framework components. Object processors encapsulate business logic that should be applied to the objects that are passed into and out of the framework. Transaction proxies allow access to the underlying transaction systems. Cache proxies allow access to any cache implementation employed by the application. The top level component is an implementation of the DataService interface and provides transactional support. Adapters provide the actual connection to the underlying data storage technology. An adapter may connect to any type of back end from a database to a web service.

Configuration of the data access framework requires that there be a configuration file created for most components of the framework that are used. The configuration files for the provided components are standard java properties files in which the configuration data is entered. Configuration for each of the provided components will be covered starting with the supporting factory and proxy classes. Each component that requires configuration includes a setter method to set the configuration file name either programmatically or via dependency injection. Note—certain provided components that can be configured will accept a comma separated list of configuration file names. In this case each of the configuration files will be read, in order, and the configurations contained within are added to the master configuration file.

These configuration files can be placed in any location but care should be taken to either place them at the root of the class hierarchy (especially when using the default file names) or the name can be fully qualified using a "/"instead of a "." as a package separator, e.g.—/com/highmark/myproj/config.properties to specify the config.properties file in the com.highmark.myproj package of one of your projects.

Component factories provide a common interface for obtaining the components used within the framework. A component factory should have a no argument constructor and implement the com.highmark.gupdaf.dataservice.componentfactory.ComponentFactoryInterface. The reference that is passed into the createComponent method is implementation specific. The framework currently provides four component factory implementations. The reference that is configured in conjunction with a factory will depend on the implementation used. The four provided types are:
    com.highmark.gupdaf.dataservice.componentfactory.JndiComponentFactory
    com.highmark.gupdaf.dataservice.componentfacto.JndiLocalComponentFactory
    com.highmark.gupdaf.dataservice.component factory.ClassComponentFactory
    com.highmark.gupdaf.dataservice.componentfactory.SpringComponentFactory The Jndi component factory does a Jndi lookup of the provided reference. The reference provided should be the fully qualified Jndi name of the object from the root of the initial context. The Jndi local component factory does a Jndi lookup of the provided reference relative to the local namespace (java:comp/env). The name should be the relative name from the local component namespace. The class component factory instantiates the classes using the Class.forName(reference).newInstance( ) method where the reference is the fully qualified class name of the component. Note: This factory may be configured to only work with components that have a no argument constructor. The spring component factory uses the context aware interface to provide a reference to lookup the component in a spring context. The reference is the configured name in the spring container.

Object Processors provide a way to apply business logic to a set of data before (pre) or after (post) a request has been processed. These processors should have a no argument constructor and implement the com.highmark.gupdaf.dataservice.ObjectProcessor interface. This interface includes a single method—process(AbstractDataServiceMessage request). In the case of a preprocessor, the current request and its attributes (including responses of previous requests) are passed into the processor. In the case of a postprocessor, the response of the current request is passed into the processor.

Transaction proxies provide an implementation of a standardized interface for the Data Service to utilize the underlying transactional system if necessary. If the data service implementation uses container managed transactions then a transaction proxy should not be necessary. A transaction proxy should contain a no argument constructor and implement the TransactionProxyInterface. This interface includes a single method—getUserTransaction( ) which returns a javax.transaction.UserTransaction object. A transaction proxy may be provided as follows:
    com.highmark.gupdaf.dataservice.transaction.WebsphereTransactionProxy The Websphere transaction proxy provides access to the user transaction within a WebSphere application server. Cache proxies provide an implementation of a standardized interface for a cache access. If the data service implementation does not use caching then a cache proxy should not be necessary. A cache proxy should contain a no argument constructor and implement the CacheProxyInterface. This interface includes several methods for managing the cache and data contained in the cache. A cache proxy can be provided as follows:

com.highmark.gupdaf.dataservice.cache.DynaCacheProxy

The DynaCacheProxy cache proxy provides access to a Dynacache instance running in a websphere application server. This proxy is able to proxy multiple instances of dynacache simultaneously. The DynaCacheProxy is configured by a properties file named "DynaCacheProxy.properties" (case sensitivity is system specific). An alternate configuration file name may be passed into the jvm so it can be read by a call to the System.getProperty("DynaCacheConfiguration") method call, e.g., DdynaCacheConfiguration=MyDynaCacheConfig.properties. This will use the MyDynaCacheConfig.properties file instead of the default file. The configurations may be spread across several files. To accomplish this, the value for the filename should be a comma separated list of files, e.g.: –DdynaCacheConfiguration=MyDynaCacheConfig.properties, MyDynaCacheConfig1.properties. This will use both the MyDynaCacheConfig.properties and MyDynaCacheConfig1.properties files. There are two sections to the configuration file for the DynaCacheProxy:

Global—contains global configuration parameters
    Instance declaration—holds a listing of the dyna cache instances managed by this proxy There are only three global configurations for the DynaCache proxy. Neither are required:
    cache.default.jndiName—specifies the default cache to use if none is specified
    cache.notFoundPolicy—defines the action to take if the requested data is not found. There are currently two values for this parameter (default is null):
        null—specifies that the proxy return a null if no data is found.
        exception—specifies that the proxy throw an exception if the data is not found.
    cache.instanceSearchPolicy—This is the search policy for the request. There are currently two possible values for this parameter (default is named):
        named—only the named (or default) cache will be searched for the requested data
        all—all managed cache instances will be searched for the requested data. The data will be returned on a first found basis if it is stored in more than one cache instance.
    Instance declaration is where the managed instances are configured. Each instance is given an abstract name that is used in configuration files of other components that utilize caching. Each instance requires a single configuration line of the form cache.reference.jndiName—the jndi name of the configured dyna cache instance.

The reference part of the key is the abstract name that is then used later in the adapter configuration files. The jndiName is the full JNDI name as configured in the admin console of the Websphere server. Below is a sample configuration file that configures two managed cache instances, instance_one with the default search policy (named) and not found policy (null) and instance_two with the default search policy (named) and an exception not found policy.

```
# the DynaCacheProxy configuration file
cache.instanceSearchPolicy=named
cache.notFoundPolicy=null
cache.default.jndiName=services/cache/instance_one
cache.instance_one.jndiName=services/cache/instance_one
cache.instance_two.jndiName=services/cache/instance_two
cache.instance_two.notFoundPolicy=exception
# end of configuration
```

DefaultDataService Configuration Overview—The data service bean is configured by a properties file name "DefaultDataService.properties" (case sensitivity is system specific.) An alternate configuration file name may be passed into the jvm so it can be read by a call to the System.getProperty("dataServiceConfiguration") method call, e.g., –DdataServiceConfiguration=MyDataServiceConfig.properties. This will use the MyDataServiceConfig.properties file instead of the default file named DataService.properties. The configurations may be spread across several files. To accomplish this, the value for the file name should be a comma separated list of files, e.g., DdataServiceConfiguration=MyDataServiceConfig.properties.MyDataServiceConfig1.properties. This will load both the MyDataServiceConfig.properties and the MyDataServiceConfig1.properties. There are two sections to the data service bean configuration:

Global—Contains defaults and adapter level configurations.
    Adapters—Contains the configurations for each adapter that can utilized.

There are only three global configuration parameters. This section should contain at a minimum the transactionProxyClass and the default.adapter configuration lines:

transactionProxyClass—The fully qualified class name of the transaction proxy implementation.
    default.adapter—The name of the adapter to be used if there is more than one adapter configured and none is specified in the request.
    default.factoryClass—The factory class to use if none is specified in the configuration for a particular component.

If not using WebSphere the user can supply a transaction proxy implementation based on whatever transaction management system is in use. See the transaction proxy section for further information.

There are three configuration parameters for each adapter. These are repeated for each adapter configured. This section should contain at least one adapter configuration.
    adapter.reference.componentFactoryClass—The fully qualified name of the component factory class.
    adapter.reference.reference—The identifier of the component needed to lookup or create the adapter.
    adapter.reference.cachePolicy—The cache policy used by this adapter. This value will override the default cache policy discussed in the "Global Configurations" section. The cache policy for an adapter refers to whether the adapter will be cached by the data service bean and not re-created (or looked up) each time it will be used.

The "reference" part of the key is the abstract reference, defined by the user, that will be used in requests to identify the proper adapter. Below is a sample configuration for a data service bean that uses the WebsphereTransactionProxy with two adapters named jpa and jdbc. The jpa adapter is obtained via the JndiComponentFactory while the jdbc adapter is obtained via the ClassComponentFactory.

```
# the data service configuration file
# the transaction proxy class
transactionProxyClass=com.highmark.gupdaf.
    dataservice.transaction.WebsphereTransactionProxy
# the default adapter to use if no adapter is specified in the request
```

```
default.adapter=jpa
# the default cache policy to use if none is provided for an
    adapter
default.cachePolicy=true
# the default factory class to use if none is configured for
    an adapter
default.factoryClass=com.highmark.gupdaf.dataservice.
    componentfactory.JndiComponentFactory
# adapter configurations.
adapter.jpa.factoryClass=com.highmark.gupdaf.
dataservice.componentfactory.JndiComponentFactory
    adapter.jpa.reference=ejblocal:jpaAdapter
    adapter.jdbc.factoryClass=com.highmark.gupdaf.
        datservice.componentfactory.ClassComponentFactory
    adapter.jdbc.reference=com.highmark.gupdaf.
        dataservice.adapter.DefaultJdbcAdapter
    adapter.jdbc.cachePolicy=false
# end of configuration
```

The DefaultJpaAdapter is configured with a properties file named "DefaultJpaAdapter.properties" (case sensitivity is system specific). An alternate configuration file name may be passed into the jvm so it can be read by a System.getProperty(method call, using the key "jpaAdapterConfiguration," e.g., -jpaAdapterConfiguration=MyJpaAdapterConfig.properties. This will use the MyJpaAdapterConfig.properties file instead of the DefaultJpaAdapter.properties file. There are three sections to the default JPA adapter configuration:

- Global—contains defaults and adapter level configurations
- Persistence Units—contains the configurations for the persistence units
- Query—contains custom query configurations and aliases for the named queries There are several default settings that can be entered for global configurations:

- default.componentFactory—This is the default component factory to be used if none is configured.
- default.queryType—This is the default query type to use if none is configured.
- default.persistenceUnit—This is the default persistence unit to use if none is configured.
- default.cacheProxyClass—This is the cache proxy to use if none is specified for the persistence unit and caching is enabled.
- default.cacheInstance—This is the name of the cache instance to use if none is specified for a persistence unit. A cache instance for the jpa adapter is used to cache out query results.

Below is an example of the global configurations for the DefaultJpaAdapter which declares the JNDI component factory, named query, EJBExamplePuOne and DynaCache proxy with cache instance instance_two as the defaults.

```
start of config file snippet
default.componentFactory=com.highmark.gupdaf.
    dataservice.componentfactory.JndiComponentFactory
default.queryType=named
default.persistenceUnit=EJBExamplePuOne
default.cacheProxyClass=com.highmark.gupdaf.
    dataservice.cache.DynaCacheProxy
default.cacheInstance=instance_two
end of config file snippet
```

The DefaultJpaAdapter can be configured to handle multiple persistence units. Each unit is given an abstract name at deployment which is referenced in the configuration file. The default persistence unit is specified using the "default.persistenceUnit" property and is the persistence unit that will be used if none is specified in the configuration file for the query identifier. If only one persistence unit is configured this unit will always be returned regardless of what is specified in a query configuration. Also if no query type is specified the default of "named" will be used to invoke a pre-configured named ejb query.

- persistenceUnits.reference.factoryClass—This is the name of the factory class to create the persistence unit.
- persistenceUnits.reference.reference—This is the reference identifier of the persistence unit.
- persistenceUnits.reference.cacheProxyClass—This is the implementation class for the cache proxy.
- persistenceUnits.reference.cacheInstance—This is the name of the configured cache instance for this persistence unit to use if none is configured for a particular query.

In the above reference is an abstract name given to the persistence units that will be used in the query configurations described later in this section.

Below is an example of persistence unit configuration. It configures two persistence units EJBExamplePuOne and examplePuTwo. Note that the examplePuTwo persistence unit uses the default settings for the component factory, cache proxy and cache instance defined in the Global Configurations section.

```
start of config file snippet
persistenceUnits.EJBExamplePuOne.factoryClass=
    com.highmark.gupdaf.dataservice.componentfacto-
    ry.JndiComponentFactory
persistenceUnits.EJBExamplePuOne.reference=java:
    comp/env/jpa/entityManagers/EJBExamplePuOne
persistenceUnits.EJBExamplePuOne.cacheProxyClass=
    com.highmark.gupdaf.dataservice.cache.DynaCacheP-
    roxy
persistenceUnits.EJBExamplePuOne.cacheInstance=
    instance_one
persistenceUnits.examplePuTwo.reference=java:comp/
    env/jpa/entityManagers/examplePuTwo
end of config file snippet
```

There are many configurable properties for each query identifier. If using the default type of "named" and the default persistence unit with no pre or post processing (the majority of cases) then no entries are required at all. When in a multi persistence unit environment then the persistenceUnit configuration will be required if not using the default (see Default Configurations section.) The basic parameters are:

- queryId—The actual name of a configured query. If this configuration entry exists, this queryId is treated as an alias to another query. The value of this configuration property will be used as the actual queryId. Any other properties defined by this identifier will override the properties of the actual query pointed to by this alias.
- queryId.persistenceUnit—The name of the persistence unit to be used for the query.
- queryId.preProcessor—A class containing pre-processing logic to be applied to the request prior to execution.
- queryId.postProcessor—A class containing post-processing logic to be applied to the results of the request.
- queryId.queryType—The type of the query. Currently "named", "native", "provided" are supported. Each query type has a separate set of configuration parameters discussed below.
- queryId.useCache—Specifies whether the results are placed in the cache for future lookup.

queryId.affectsCache—Specifies whether this query will affect the contents of the cache. Works in conjunction with the queryId.cacheKeys entry to ensure the cache is maintained.

queryId.cacheKeys—A comma separated list of query identifiers whose cached data sets are affected by the execution of this query identifier. If affectsCache is set to true for this query identifier then the identifiers in the list will have their cache entries invalidated so the next access attempt will reload that query identifier's data set into cache.

queryId.cacheInstance—Specifies the cache instance to use if caching is enabled.

In the above the queryId is an abstract name used to uniquely identify a particular database operation or interaction. This usually results in executing a query to retrieve data or processing a set of entity objects to update/insert/delete data in the database. This identifier is used by the programmers when creating requests to be processed by the framework.

There are three types of jpa query types supported, named, native, and provided. Each type has its own set of configuration properties.

1. Named queries are standard named JPA queries that are configured either in a JPA mapping file or via the @NamedQuery annotation embedded in the entity object. They require no additional configuration with the exception of the persistenetUnit if the query is not part of the default persistence unit.
2. Provided queries are identical to named queries except that the query is passed into the adapter in the parameter map under the key queryId.providedQuery.
3. Native queries are standard SQL queries that can be executed and subsequently mapped to a pojo by the JPA framework. These queries provide extreme flexibility but lack the ability to push updates back to the database via the POJO. There are several properties that are used with native queries.
    a. queryId.className—the class to map the result set to. Note that care should be taken to ensure that the column names returned by the result set match the POJO attributes exactly. If the columns of the database do not match the POJO attributes then the columns should be aliased so that they do match.
    b. queryId.parameterIndex.?—This configuration value is the key value for the parameter at index ? (where ? is the integer index of the substitution parameter in the query.) There should be one entry for each substitution parameter with the first index being 1.

```
# native query configuration file snippet EJBExamplePuOne
GetEntityDetails.persistenceUnit=EJBExamplePUOne
GetEntityDetails.queryType=native
GetEntityDetails.nativeQuery=SELECT client_Id, client_Name, client_Number, client_status, client_Type FROM client WHERE client_status=?
GetEntityDetails.useCache=false
GetEntityDetails.className=com.company.model.Client
GetEntityDetails.parameterIndex.1=primaryRecStatus
# native query configuration file snippet end
```

The DefaultJdbcAdapter is configured with a properties file named "DefaultJdbcAdapter.properties" (case sensitivity is system specific). An alternate configuration file name may be passed into the jvm so it can be read by a System.getProperty( ) method call, using the key "jdbc-AdapterConfiguration," e.g., —DjdbcAdapterConfiguration=MyJdbcAdapterConfig.properties. This will use the MyJdbcAdapterConfig.properties file instead of the defaultJdbcAdapter.properties file. There are three sections to the default Jdbc adapter configuration:

Global—contains defaults and adapter level configurations

Data Sources—contains the configurations for the data sources

Query—contains custom query configurations and aliases for the named queries

There are several default settings that can be entered for global configurations:

default.componentFactory—This is the default component factory to be used if none is configured.

default.datasource—This is the default data source to use if none is configured for a query.

default.cacheProxyClass—This is the cache proxy to use if none is specified for the persistence unit and caching is enabled.

default.cacheInstance—This is the name of the cache instance to use if none is specified for a persistence unit.

Below is an example of the global configurations for the DefaultJdbcAdapter which declares the JNDI component factory, datasource of examplePuOne and DynaCache proxy with cache instance instance_one as the defaults:

```
start of config file snippet
default.cacheProxyClass=com.highmark.gupdaf.dataservice.cache.DynaCacheProxy
default.cacheInstance=instance_one
default.componentFactoryClass=com.highmark.gupdafdataservice.componentfactory.JndiComponentFactory
default.datasource=examplePuOne
end of config file snippet
```

The DefaultJdbcAdapter can be configured to handle multiple data sources. Each data source is given an abstract name which is referenced in the configuration file in the query section. The default data source is specified using the "default.datasource" property and is the data source that will be used if none is specified in the configuration file for a query identifier. If only one data source is configured it will always be returned regardless of what is specified in a request or a query.

jdbc.datasources.reference.factoryClass—This is the name of the factory class to create the data source unit.

jdbc.datasources.reference.reference—This is the reference identifier of the data source unit.

jdbc.datasources.reference.cacheProxyClass—This is the implementation class for the cache proxy.

jdbc.datasources.reference.cacheInstance—This is the name of the configured cache instance for this data source to use if none is configured for a particular query.

In the above reference is an abstract name given to the data sources that will be used in the query configurations described later in this section. Below is an example of data source configuration. It configures two data sources; examplePuOne and examplePuTwo. Note that the examplePuTwo data source uses the default settings for the component factory, cache proxy and cache instance defined in the Global Configurations section:

```
start of config file snippet
jdbc.datasources.oracle_xa.componentFactoryClass=com.highmark.gupdaf.dataservice.componentfactory.JndiLocalComponentFactory
jdbc.datasources.oracle_xa.reference=jdbc/oracle_xa
``` jdbc.datasources.oracle_xa.cacheProxyClass=com.
  highmark.gupdaf.dataservice.cache.DynaCacheProxy
jdbc.datasources.oracle_nonxa.componentFactory
  Class=com.highmark.gupdaf.dataservice.
  componentfactory.JndiLocalComponentFactory
jdbc.datasources.oracle_nonxa.reference=
  jdbc/oracle_nonxa
jdbc.datasources.oracle_nonxa.cacheProxyClass=
  com.highmark.gupdaf.dataservice.cache.DynaCacheP-
  roxy
end of config file snippet Query Configurations—There are many properties for each query identifier. If using the default type of "select" and the default datasource with no pre or post processing (the majority of cases) only the query and className are required. When in a multi data source environment then the datasource configuration will be required if not using the default (see Default Configurations section.) The basic parameters are:

queryId—The actual name of a configured query. If this configuration entry exists, this queryId is treated as an alias to another query. The value of this configuration property will be used as the actual queryId. Any other properties defined by this identifier will override the properties of the actual query pointed to by this alias.

queryId.queryType—The type of the query that is to be executed. Currently there are three types—select, callable, prepared.

queryId.query—The actual query to be run for this identifier.

queryId.datasource—The name of the data source to be used for the query.

queryId.returnType—The return type for the query. Currently dom and pojo are supported. If not provided it will default to pojo.

queryId.className—The name of the class to be mapped to the result set if returnType is pojo. The name of the row tag if returnType is dom.

queryId.dynamicInsert—Dynamically constructs an insert statement using the metadata from the database. This is used in conjunction with the queryId.tableName parameter.

queryId.tableName—Sets the table to be used for the dynamic insert.

queryId.returnDefaultObject—Specified whether the query will return a default object of the types specified in the configuration rather than an empty list if no data is found.

queryId.preProcessor—A class containing pre-processing logic to be applied to the request prior to execution.

queryId.postProcessor—A class containing post-processing logic to be applied to the results of the request.

queryId.returnWebRowSet—A Boolean indicating the row WebRowSet xml to be returned if returnType is set to dom. Defaults to false. If returnType is set to pojo it has no affect queryId.returnDomPerRow—A Boolean indicating whether to split the dom response into a separate dom object for each row returned to mimic the behavior of a pojo. Defaults to false. If returnType is set to pojo it has no affect.

queryId.useCache—Specifies whether the results are placed in the cache for future lookup.

queryId.affectsCache—Specifies whether this query will affect the contents of the cache. Works in conjunction with the queryId.cacheKeys entry to ensure the cache is maintained.

queryId.cacheKeys—A comma separated list of query identifiers whose cached data sets are affected by the execution of this query identifier. If affectsCache is set to true for this query identifier then the identifiers in the list will have their cache entries invalidated so the next access attempt will reload that query identifier's data set into cache.

queryId.cacheInstance—Specifies the cache instance to use if caching is enabled.

In the above the queryId is an abstract name used to uniquely identify a particular database operation or interaction. This usually results in executing a query to retrieve data or processing a set of data objects to update/insert/delete data in the database. This identifier is used by the programmers when creating requests to be processed by the framework.

start of config file snippet
IcisValidateClient.datasource=oracle_xa
IcisValidateClient.queryType=callable
IcisValidateClient.query={call     VALIDATE_CLIENT
  (?,?,?,?)}
IcisValidateClient.parameterIndex.1=p_UserType
IcisValidateClient.parameterIndex.2=p_EntityId
IcisValidateClient.parameterIndex.3=p_EntityType
IcisValidateClient.parameterIndex.4=o_PassFail
IcisValidateClient.parameterIndex.4.direction=OUT
IcisValidateClient.parameterIndex.4.type=NUMERIC
IcisValidateClient.rocessr.ompostPcentFactoryClassor.
  componentFactorlass=com.highmark.gupdaf.
  dataservice.componentfactory.ClassComponentFactory
IcisValidateClient.postProcessor.reference=com.
  highmark.cltdcc.record.processor.ValidationPrePost-
  Processor
end of config file snippet The DefaultSOAPAdapter is configured with a properties file named "DefaultSOAPAdapter.properties" (case sensitivity is system specific.) An alternate configuration file name may be passed into the jvm so it can be read by a System.getProperty( ) method call, using the key "soapAdapterConfiguration," e.g., DsoapAdapterConfiguration=MySOAPAdapterConfig.properties. This will use the MySOAPAdapterConfig.properties file instead of the DefaultSOAPAdapter.properties file. There are two sections to the default SOAP adapter configuration:

Global—contains defaults and adapter level configurations

Endpoints—contains the configurations for the SOAP based web service endpoints

There are several default settings that can be entered for global configurations. These are:

default.http.proxyHost—this is the http proxy to use if the http.proxySet attribute is true.

default.http.proxyPort—This is the http port to use if the http.proxySet attribute is true.

default.http.proxySet—A true or false value indicating whether to use the http proxy or not.

default.https.proxyHost—this is the https proxy to use if the https.proxySet attribute is true.

default.https.proxyPort—This is the https port to use if the https.proxySet attribute is true.

default.https.proxySet—A true or false value indicating whether to use the https proxy or not.

Below is an example of the global configurations for the DefaultSOAPAdapter which declares both the http and https host and port to invalid values and also turns them off by setting both the proxySet values to false:

start of config file snippet
default.http.proxyHost=none.http.url.or.ip
default.http.proxyPort=0
default.http.proxySet=false
default.https.proxyHost=none.http.url.or.ip
default.https.proxyPort=0
default.https.proxySet=false
end of config file snippet There are several properties for each endpoint. There may be only two required configurations:
   endpointId.url—The URL of the service.
   endpointId.operation—The name of the operation being invoked for this service.

The rest of the configurations are optional and are not required. There is a single optional service level configuration which is,
   endpointId.action—The default action to be used if none is specified for a particular operation.

There are several operation level configurations, these are,
   endpointId.operationName.action—The action to be used for this operation. If none is defined it will use the endpoint action. If no endpoint action is defined then it will use the default.
   endpointId.operationName.namespace—this is the default namespace for the call. If none is provided then no default namespace will be added.
   endpointId.operationName.namespace.ns1—adds a named namespace. The name of the namespace is the final part of the key (ns1 in this example).

In the above the endpointId is an abstract name used to uniquely identify a particular web service that can be called. This identifier is used by the programmers when creating requests to be processed by the framework. operationName is the name of the operation specified by the endpointId.operation entry. Below is an example of the endpoint configurations. It configures a single endpoint with three namespaces:

start of config file snippet
here is a service configuration
this is the base URL
testSOAPService.url=http://testServer.company.com/services/SoapService
testSOAPService.operation=someOperation
the optional action is used in the soap header.
the default action will be used
if not specified here
testSOAPService.action=someAction
enter a list of namespaces to add to the service
the default namespace is the first one without any .XXX appended to it.
testSOAPService.someOperation.namespace=http://some.namespace.com/some/namespace
testSOAPService.someOperation.namespace.ns1=http://some.namespace.com/some/other/namespace
testSOAPService.someOperation.namespace.myNs=http://company.com/some/namespace
end of config file snippet The DefaultRESTAdapter is configured with a properties file named "DefaultRESTAdapter.properties" (case sensitivity is system specific.) An alternate configuration file name may be passed into the jvm so it can be read by a System.getProperty( ) method call, using the key "restAdapterConfiguration," e.g., DrestAdapterConfiguration=MyRESTAdapterConfig.properties. This will use the MyRESTAdapterConfig.properties file instead of the DefaultRESTAdapter.properties file.

There are two sections to the default REST adapter configuration:
   Global—contains defaults and adapter level configurations
   Endpoints—contains the configurations for the REST based web service endpoints There are several default settings that can be entered for global configurations:
   default.http.proxyHost—this is the http proxy to use if the http.proxySet attribute is true.
   default.http.proxyPort—This is the http port to use if the http.proxySet attribute is true.
   default.http.proxySet—A true or false value indicating whether to use the http proxy or not.
   default.https.proxyHost—this is the https proxy to use if the https.proxySet attribute is true.
   default.https.proxyPort—This is the https port to use if the https.proxySet attribute is true.
   default.https.proxySet—A true or false value indicating whether to use the https proxy or not.

Below is an example of the global configurations for the DefaultJMSAdapter which declares both the http and https host and port to invalid values and also turns them off by setting both the proxySet values to false:

start of config file snippet
default.http.proxyHost=none.http.url.or.ip
default.http.proxyPort=0
default.http.proxySet=false
default.https.proxyHost=none.http.url.or.ip
default.https.proxyPort=0
default.https.proxySet=false
end of config file snippet There are several properties for each endpoint. There is only one required configuration for each endpoint, it is,
   endpointId.url—The URL of the service.

There are four optional parameters (six if you count the deprecated entries). These parameters govern the input source type and the return object type. The first two are legacy to maintain backwards compatibility and only control the format of the output.
   endpointId.returnType—the type of the object the service will return. There are currently three types supported, string/dom/pojo. The default return type is string. NOTE—this entry has been deprecated
   endpointId.jaxBContext—this is the context for the JAXB binder if the returnType is pojo. NOTE—this entry has been deprecated
   endpoint.requestType—the type of the object that contains the data for the service call.

There are currently three types supported:
   string—This is the default type and should be a string representation of the body of the service call. There will be no translations done to this data.
   dom—Specifies that a DOM object will be provided as the input to the service.
   pojo—Specifies that a pojo will be provided as the input to the service. The pojo will be translated via jaxb into xml
   endpointId.request.jaxBContext—this is the context for the JAXB binder if the requestType is set to pojo.
   endpointId.responseType—the type of the object that will be returned by the service in the response. There are currently three types supported:
      string—This is the default type.
      dom—Specifies that the response will be translated into a DOM object.

pojo—Specifies that a pojo will be provided as the input to the service. The pojo will be translated via jaxb into xml endpointId.response.jaxBContext—this is the context for the JAXB binder if the responseType is set to pojo.

If the service is a GET service then you should provide an entry for each parameter. The names provided as the values for the parameters are the keys into the map to append the data to the service call. Since there is often more than one parameter the X in the below example should be replaced by an integer denoting the order it should be appended.

endpointId.parameter.X—The X in the key is an integer denoting the position of the parameter. The value of the entry is used to extract the input data from the map passed in the request.

In the above example, the endpointId is an abstract name used to uniquely identify a particular web service that can be called. This identifier is used by the programmers when creating requests to be processed by the framework.operationName is the name of the operation specified by the endpointId.operation entry.

Below is an example of the endpoint configurations. It configures a three endpoints, one a get service with three parameters, the second is a get service that accepts fixed parameters (none passed in) and returns a pojo (using the legacy/deprecated configurations), the third is a post service that supplies a pojo and returns a pojo using the current configurations:

```
start of config file snippet
here is a service configuration
this is the base URL
testGet.url=http://appstenv7.highmark.com/services/currentContract/
# for a REST GET operation this is the parameter list that will
# be appended to the above URL+operation
testRESTService.parameter.1=clientNumber
testRESTService.parameter.2=productLine
testRESTService.parameter.3=contractDate
# here is the service config for a get service that accepts no
# parameters and returns a pojo
businessCodesService.url=http://company.com:7081/services/businessCodeList
returnType=pojo
businessCodesService.jaxBContext=com.company.model
# here is the service config for a post service that accepts a pojo
# and returns a pojo
createCodeService.url=http://company:7081/HMK/SVC/services/addCode
createCodeService.requestType=pojo
createCodeService.request.jaxBContext=com.company.model
createCodeService.responseType=pojo
createCodeService.response.jaxBContext=com.company.model
end of config file snippet
```

The DefaultJMSAdapter is configured with a properties file named "DefaultJMSAdapter.properties" (case sensitivity is system specific.) An alternate configuration file name may be passed into the jvm so it can be read by a System.getProperty( ) method call, using the key "jmsAdapterConfiguration," e.g., DjmsAdapterConfiguration=MyJMSAdapterConfig.properties. This will use the MyJMSAdapterConfig.properties file instead of the DefaultJMSAdapter.properties file. There are two sections to the default JMS adapter configuration:

Global—contains defaults and adapter level configurations

Destinations—contains the configurations for the JMS queue destinations

There are several default settings that can be entered for global configurations:

default.queueConnectionFactory—this is the queue connection factory that will be used if no other factory is specified for an individual destination identifier.

default.requestQueueName—This is the default queue that will be used when publishing a message if no queue is specified for an individual destination identifier.

default.responseQueueName—The name of the default queue to be used when consuming a message if no other queue is specified for an individual destination identifier.

default.retrieveResponse—This identifies the default behavior of using a request/response queue pattern. The default is false if this configuration parameter is not specified.

default.responseWaitTime—This is the time in milliseconds the framework will wait for a response message to be published before giving up and returning an error.

Below is an example of the global configurations for the DefaultJMSAdapter that defines a default connection factory of JMS/QCF along with a default request queue of JMS/HM_LOCAL_DEFAULT_NOTIFICATIONS_REQ.WS and a default reply queue of JMS/HM_LOCAL_DEFAULT_NOTIFICATIONS_REQ.WS. The retrieve response is set to true and the framework will wait 10 seconds (10000 milliseconds) for the reply:

```
start of config file snippet
default.queueConnectionFactory=JMS/QCF
default.requestQueueName=JMS/NOTIFICATIONS_REQ
default.responseQueueName=JMS/NOTIFICATIONS_RESP
default.retrieveResponse=true
default.responseWaitTime=10000
end of config file snippet
```

The configurations for each destination are identical to the default set.

destinationId.queueConnectionFactory—this is the queue connection factory that will be used for this destination identifier.

destinationId.requestQueueName—This is the queue that will be used when publishing a message for this destination identifier.

destinationId.responseQueueName—The name of the queue to be used when consuming a message for this destination identifier.

destinationId.retrieveResponse—This identifies whether to use a request/response queue pattern.

destinationId.responseWaitTime—This is the time in milliseconds the framework will wait for a response message to be published before giving up and returning an error.

Below is an example of the endpoint configurations. It configures a destination that uses the default connection factory and specifies a request queue of JMS/REPORTS_REQ and a reply queue of JMS/REPORTS_RESP. The request/reply pattern is turned on and the wait time is specified at 5 seconds:

```
start of config file snippet
reports.requestQueueName=JMS/HM_LOCAL_DEFAULT.REPORTS_REQ.WS
``` reports.responseQueueName=JMS/HM_LOCAL_DE-
   FAULT.REPORTS_REP.WS
reports.retrieveResponse=true
reports.responseWaitTime=5000
end of config file snippet Requests and responses are the primary method of interacting with the framework. The programmer will build a request or list of requests to pass to the framework to be processed within a transaction. The framework will return a response or list of responses (one for each request processed.)

A standard request contains all the information necessary for the framework to process a repository interaction. A request may contain the following attributes, for example:
 1. identifier—this is the identifier (referred to as the queryId in this document) that identifies the interaction. It is used to determine which configuration properties to use to complete the request.
 2. adapter—this is the configured name of the adapter that will be used to process the request. If this value is null or empty the default adapter will be used.
 3. operation—this is the type of operation that the adapter will perform. There are currently four types of operations, GET, PUT, POST, DELETE that correspond to the 4 basic data manipulation operations. If this value is null or empty the default of GET will be used.
 4. shouldProcess—this is a flag available to determine if this request should be processed in the scope of the transaction. It is most often set/unset in a preprocessor to disable a particular request based on the outcome of a previous request. The default is true so the request will process.
 5. Data—this is the data that the request needs to operate on. In the case of a GET this will be the filter criteria. In the case of a PUT or POST it will be the data that will be updated to the repository. In the case of a DELETE it will be the key values to identify the data to be removed from the repository.
 6. propagationList—this is the list of responses from all previous requests executed in the current transaction. This attribute is typically only used by pre-processor elements and its value is controlled by the framework. A developer will never directly set this attribute, only read its contents when necessary.

Responses are returned from the framework for each request in the transaction processed. They will generally be returned in the same order that the requests are processed but this is not guaranteed (especially in the case where a shouldProcess flag is set to false for a request.) A response is generated for each request that is processed and will contain the same information with the exception of the data attribute. This is so the caller can clearly identify each response and match it to the correct request in the case that the response list does not match the request list. Responses contain the first five attributes listed above for a request and include the following additional attribute:
 1. messageStatus—this is the return status of the request and indicates whether the request processing succeeded or not.

Note that the data attribute of the response does not hold the request information. It contains any information generated by the repository in response to the request. In the case of a GET it will contain a list of the data returned from the query. In the case of a POST, PUT, DELETE it will typically contain the count of the number of entities affected (this will depend on the type of repository the request is processed against.)

This section describes the utilities that are provided by the framework and can be used independently of the framework. The provided properties object is a drop in replacement for the java properties object. It extends the standard properties object to also allow access to key value pairs not only from the file system but also from an XML file with an arbitrary structure or JNDI namespace. To accomplish this several load methods may be used.
   loadFromJNDI—Loads data from the JNDI namespace. This method will walk the global JNDI namespace from its root context and add all entries converting the JNDI path into a dot separated key by replacing the "/"with a".". Any primitive value (numbers, dates, etc.) will be translated to a string while any complex objects will be ignored.
   loadFromLocalJNDI—Loads data from the local JNDI context. This method behaves exactly like the loadFromJNDI except it uses the "java:comp/env" context as the root of the search instead of the global namespace context as the root of the search.
   loadFromAnyXML—Loads data from any XML document. As with the JNDI loader the xpath expression to the data element will be converted to a dot separated list of tag names from the root element of the document.
Properties Object Examples:
For loadFromJNDI, given the following entries into the global JNDI namespace:
   "/my/rest/getConfiguration" with a value of "RestGetConfiguration.properties"
   "/my/rest/putConfiguration" with a value of "putConfigs.properties,putConfigs1.properties"
Would produce the foiling key value pairs:
   my.rest.getConfiguration=RestGetConfiguration.properties
   my.rest.putConfiguration=putConfigs.properties,putConfigs1.properties
For loadFromLocalJNDI, given the following entries in a web.xml or an ejb-jar.xml:
   <env-entry>
      <env-entry-name>
         dataservice/rest/getConfigurationFileName</env-entry-name>
      <env-entry-value>RestGetConfiguration.properties</env-entry-value>
   </env-entry>
   <env-entry>
      <env-entry-name>
         dataservice/rest/putConfigurationFileName</env-entry-name>
      <env-entry-value>putConfigs.properties,putConfigs1.properties</env-entry-value>
   </env-entry>
Would produce the following key value pairs:
   dataservice.rest.getConfigurationFileName=RestGetConfiguration.properties
   dataservice.rest.putConfigurationFileName=putConfigs.properties,putConfigs1.properties
For loadFromAnyXML, given the following arbitrary XML document:
<?xml version="1.0" encoding="UTF-8"?>
<properties>
   <default>
      <adapter>jdbc</adapter>
      <operation>GET</operation>
      <dataService>ejbLocal:dataService</dataService>
   </default>
   <clientId>

```
<query>select * from client where client_id=?</query>
    <params>
        <clientId keyValue="1">clientId</clientId>
    </params>
</clientId>
<default>
    <data>myDataValue</data>
</default>
</properties>
```
Would produce the following key value pairs:
default.adapter=jdbc
default.operation=GET
default.dataService=ejbLocal:dataService
clientId.query=select * from client where client_id=?
clientId.params.1=clientId
default.data=myDataValue The root tag of the arbitrary XML document should be <properties>. Each tag may have an optional attribute named "keyValue". If present the value of this attribute is used as the value of the key part instead of the actual tag name. This has been done to allow for the use of illegal characters and/or numbers which are not allowable as tag names in an XML document.

The PropertiesManager is a simple management and caching mechanism for the highmark properties object. It manages the creation, caching, and refresh of the properties objects in an application. The factory can be configured to provide a default method of access (filesystem or Database) as well as a specific configuration for any or all of the properties files being managed. This allows for you to mix storage types.

When a configuration is requested an internal map is checked to see if the properties object has already been loaded. If it has not then the manager looks for a configuration for the provided identifier. If none is found the default settings are used to load the properties object. Once loaded it is placed into the map and returned to the caller.

The manager provides two methods for programmatically refreshing the cache. The refresh method accepts a string identifier for the configuration being requested. If the string is not null then it will remove the cache entry associated with the identifier. if the string is null then it will clear the entire cache. The refreshAll method is a convenience method that delegates to the refresh method passing in a null identifier.

There are several default configurations for the properties manager. These configurations should be put into a file named "PropertiesManager.properties" and should be put at the root of one of the application's class loaders.

No explicit configuration is required. if there is no configuration file present the manager will revert to the default method of a file based resource with the identifier being the fully qualified resource name from a class path root and using a shared copy of the properties objects. Note that the properties file can use the standard substitution pattern to allow it to be used across multiple environments.

There are two master configurations. The first is "preserveMasterConfigurations" this is a true/false property that governs whether the manager returns a reference to the master copy or whether the manager returns a copy of the master. This can be important if a process needs to modify the configurations at runtime without affecting the master copy so future runs will not inherit the changed configurations. The default is "false" which gives out the shared copy. The second is "cacheInstanceName" which is the JNDI name of the cache instance that should be used for the caching. if this configuration is not present (or the cache instance cannot be found) the manager will use a standard concurrent hashmap to cache the properties objects.

If configurations are found, there are two types of configuration sets, one for the file based access and one for the database based access. These sets can be entered for each identifier to allow each identifier to be handled differently or can be set as defaults to be used if you do not want to enter them for each identifier. The following is an example of the properties file entries:
preserveMasterConfigurations=true
cacheInstanceName=services/cache/properties_cache
penv.dataBaseName=picis
tenv1.dataBaseName=sicis
tenv2.dataBaseName=micis
tenv3.dataBaseName=iicis
default.storageType=File
default.fileFormat=standard
defaut.dataSource=jdbc/oracle_${dataBaseName}
default.jdbcDriverClass=com.oracle.jdbc.OracleDriver
default.jdbcUrl=jdbc:oracle:oci8:@micis
default.jdbcUserName=lidxxx1
default. jdbcPassword=bGlkZTlmZA==
default.tableName=properties_table
default.fileColumnName=filecolumn
default.keyColumnnName=keycolumn
default.valueColumnName=valuecolumn
default.timeToLive=0
default.propertiesClass=com.highmark.gupdaf.utilities.
    Properties
dbConfig.local.jdbcDriverClass=com.oracle.jdbc.
    OracleDriver
dbConfig.local.jdbcUrl=jdbc:oracle:oci8:@micis
dbConfig.local.jdbcUserName=lidxxx1
dbConfig.local.jdbcPassword=bGlkZT1mZA==
dbConfig.local.tableName=props_table
dbConfig.local.fileColumnName==configset
dbConfig.local.keyColumnName=keyvalue
dbConfig.local.valueColumnNamne=datavalue
process1.resourceName=com/highmark/
    ccr/enterprise/Configuration.properties
process2.storageType=Database
process2.dbConfig=local
process3.storageType=Database
process3.resourceName=copyProcess Given the above configuration file:
The default storage type for any identifier not named in another configuration block For all database storage the default data source is "jdbc/oracle_" with the substitution value appended For all database storage the default table name is "properties_table"

For all database storage the default name for the column name that holds the file identifier is "filecolumn"

For all database storage the default name for the column name that holds the key identifier is "keycolumn"

For all database storage the default name for the column name that holds the file identifier is "valuecolumn"

For all configurations the time to live is "0"

For the identifier "process1" the actual resource name used will be "com/highmark/ccr/enterprise/Configuration.properties"

For the identifier "process2" the storage type is database using the defaults for data source, file, key, and value column names For the identifier "process3" the storage type is database using the defaults for data source, key, and value, but using the file identifier of "copyProcess"

For all other identifiers the storage method will be "file" and the identifier will be used as the resource name.

The timeToLive configuration is a time based refresh mechanism. The value entered here represents the number of hours the data will live in the cache before it is automatically refreshed by the properties manager. A value of zero (0) indicates that there is no expiration of the cached data. If this property is omitted for an identifier then it will use the setting from the default entry. If there is no default entry then the value will default to zero.

This section describes the built in extensions to the framework as well as Universal REST Framework. The universal rest framework is a single rest service that is a configurable front end for the data access framework. Its configurations allow it to expose any configured query identifier to the external world via a REST call. Once configured the framework will expose REST web services without the need for coding using the following URL format:

<Base URL>/rootContext/queryID/ . . . ?queryParam=value& . . .

Where <Base URL> is the base URL of the web application including the servlet mapping to the rest servlet, the rootContext is the configured root context (defaults to "dataService") of the framework, the queryID is the query identifier for the data service. The " . . . " following the queryID indicates that any number of path parameters may be configured for each individual service and as always a variable number of query parameters may be passed in.

If you deployed the framework into a server "mydomain.com" under the root web context of "myapp" and used a servlet mapping of "/services/*", without overriding any of the other defaults a service configured with the queryID of "clientInfo" would have the base URL of: http://mydomain.com/myapp/services/dataService/clientInfo. If the client number were configured as a path parameter, then access to the service to bring back the client information for client number 155694 would take the form: http://mydomain.com/myapp/servivces/dataService/clientInfo/155694. If the client number were configured as a query parameter, then access to the service to bring back the client information for the same client would take the form: http://mydomain.com/myapp/servivces/dataService/clientInfo?clientNumber=155694

The REST data service resource should be configured in your REST application servlet just as any other resource. Once this has been done there are 2 sets of configurations, each using a single file or a set of properties files. The file names are configured in the web.xml or the ejb-jar.xml of the module it is being deployed into.

The first set of configurations are for the service. They deal with service wide settings that affect all verbs. These settings are global and apply to each of the services exposed by the framework. The file name is configured in the deployment descriptor using the JNDI name "dataservice/rest/serviceConfigurationFileName". The following service wide settings are available:

- rootContext—the root context for the rest hierarchy. If none is configured it will default to a value of "dataService".
- jaxbContextPolicy—value that determines whether the default jaxb context is appended to the package list when creating the context for marshalling and unmarshalling. The valid values are "append" and "replace". If no value is configured it will default to a value of "append".
- jaxbContext—the default jaxb context that will be either used or appended to the configured jaxb context. If none is provided it will default to a value of "com.highmark.gupdaf.universalRest.types"
- requestClass—the default class for any incoming request for a PUT, POST, or DELETE service call. If none is configured it will default to a value of "com.highmark.gupdaf.universalRest.types.DefaultRequest".
- responseClass—this is the default class for the response to be returned. If none is configured it will default to a value of "com.highmark.gupdaf.universalRest.types.DefaultResponse".
- executionProcessor—the class of the execution processor plugin to execute custom code immediately before and after the service executes. This is intended for service wide customizations like security. If individual query customizations are required use the pre/post processor plugins in the data service.

Following is a sample of a service wide configuration file:
rootContext=ccrDataService
jaxbContext=com.highmark.gupdaf.universalRest.types: com.highmark.ccr.types
requestClass=com.highmark.ccr.RestRequest
responseClass=com.highmark.ccr.RestResponse
jaxbContextPolicy=append
executionProcessor=com.highmark.ccr.processor. SecurityProcessor
executionProcessor.userId=CCRID
executionProcessor.bpdList=1,2,3,4,5,6,7,8,9,10,11,12

The above entries overload the defaults for rootContext, jaxbContext and the request/response classes. There is an execution processor defined as well as some extra sub entries for the execution processor. Any executionProcessor sub entries will be passed along to the execution processor. Note that any of the configurations for a path or query parameter can also be defaulted.

The second set is the set of verb configurations which contain the descriptions of the available services. Each verb has its own set of configurations which allow you to process a particular query ID using one or all of the available verbs. Any verbs not configured will return a 404 not found error to the caller. The user can specify the name of the configuration files for each of the 4 verbs (GET, PUT, POST, DELETE) that are processed by the data access framework. The file name for each verb is configured in the web.xml as environment entries using the following key pattern:
dataservice/rest/???ConfigurationFileName
Where "???" is the verb for the REST service in lowercase letters. The name can be a comma separated list allowing you another layer of granularity in organizing your configurations.

Excerpt from web.xml:
```
<env-entry>
    <env-entry-name>dataservice/rest/getConfiguration-
        FileName</env-entry-name>
    <env-entry-value>RestGetConfiguration.properties
        </env-entry-value>
</env-entry>
<env-entry>
    <env-entry-name>
        datservice/rest/putConfigurationFileName</env-
        entry-name>
    <env-entry-value>putConfigs.properties,
        putConfigs1.properties</env-entry-value>
</env-entry>
```
The above entry will configure the GET verb using the configuration file named "RestGetConfiguration.properties" and the PUT verb using 2 files named "putConfigs.properties" and "putConfigs1.properties". Each verb configuration file should contain at a minimum at least one configuration entry for each service exposed by the framework for that verb. In addition to the service configurations, optional defaults for each configuration property can be set. The possible properties are:

queryId—this allows the user to configure a different data service queryID so the service name can be an abstract identifier.
    dataService—the reference name of the data service.
    dataServiceFactory—the component factory to use for the data service.
    adapter—the adapter to use for the data service request
    jaxbContext—the context to use for any jaxb conversions.
    requestClass—the name of the class to be used to convert the request
    responseClass—the name of the class to be used for the response.
    pathParams.?.key—the key for the data service request parameter map
    pathParams.?.converter—the class name for the data converter.
    pathParams.?.validator—the class name for the data validator.
    queryParams.?.isRequired—true/false value indicating whether this query parameter is required.
    queryParams.?.key—value for the key in the data service request parameter map. if none is provided the key will default to the query parameter name.
    queryParams.?.converter—the class name for the data converter.
    queryParams.?.validator—the class name for the data validator.
    transformation.?.xslt—xslt for a transformation.
    transformation.?.reference—name of an xslt document on the filesystem.

Following is an example of setting the defaults for the above properties:

default.dataService=ejblocal:dataService
    default.dataServiceFactory=com.highmark.gupdaf.factory.JNDIComponentFactory
    default.adapter=jdbc
    default.jaxbContext=com.highmark.ccr.types
    default.requestClass=com.highmark.ccr.ClientRequest
    default.responseClass=com.highmark.ccr.ClientResponse The above entries allow exposed services to use the data service deployed at JNDI name "ejblocal:dataService." In addition to the above there are two groups of properties to configure the path and query parameters for each service. Each set is a grouping of sub entries using either "pathParams" or "queryParams" as the root of the key after the queryId.

The path parameters are configured using the pathParams property set, which describes the path parameters used by the service. If any path parameters are used in the service then a set of pathParams properties are required for each path parameter used. Path parameters are referenced using an index so they can be associated with the correct path element. This creates a compound root of "pathParams.?", where the "?" is the numeric index (starting at zero) of the path element not including the queryId. Following is an example of pathParams entries for the clientInfo query identifier:

clientInfo.pathParams.0.key=clientId
    clientInfo.pathParams.0.converter=com.company.converter.NumberConverter
    clientInfo.pathParams.1.key-eff_frm_dt
    clientInfo.pathParams.1.converter=com.company.converter.DateConverter
    clientInfo.pathParams.1.converter.dateFormat=YYYYMMDD
    clientInfo.pathParams.1.validator-com.company.validator.DateRangeValidator
    clientInfo.pathParams.1.validator.dateFormat=YYYYMMDD
    clientInfo.pathParams.1.validator.minRange=20150101
    clientInfo.pathParams.1.validator.maxRange=20151231

The query parameters are configured using the queryParams property set, which describes the query parameters used by the service. Query parameters are optional by nature but can be forced to be required using the isRequired property. Query parameters are referenced by name which creates a compound root of "queryParams.?", where the "?" is the name of the expected query parameter, not including the queryId. Following is an example of queryParams entries for the clientInfo query identifier:

clientInfo.queryParams.clientNumber.isRequired=true
    clientInfo.queryParams.clientNumber.key=clientId
    clientInfo.queryParams.clientNumber.converter-com.highmark.ccr.converter.NumberConverter
    clientInfo.queryParams.effFromDate.key=eff_frm_dt
    clientInfo.queryParams.effFromDate.converter=com.company.converter.DateConverter
    clientInfo.queryParams.effFromDate.converter.dateFormat=YYYYMMDD
    clientInfo.queryParams.effFromDate.validator=com.company.validator.DateRangeValidator
    clientInfo.queryParams.effFromDate.validator.minRange=20150101
    clientInfo.queryParams.effFromDate.validator.maxRange=20151231

There is a set of xsl transformations that can be applied in a pipeline using the transformation property set, which holds a set of xslt docs used in the transformation of the response. the individual XSL transformation documents are referenced by index which creates a compound root of "transformation.?.xslt" or "transformation.?.reference", where the "?" is the index and represents the order which the transforms are applied. Following is an example of the transformation entries for the clientInfo query Identifier:

clientInfo.transformation.1.xslt=<?xml version="1.0" encoding="UTF-8"?> . . .
    clientInfo.transformation.1.reference=My Transformation.xslt If both a reference and the xslt are given the system may use the xslt provided and not read the file.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, configurations, data definitions, or process flows described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general-purpose processor or application specific processor. The embodiments, however, are not limited in this context.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein, including in the attached appendices, all of which are incorporated herein and form an integral part of this description.

What is claimed is:

1. A computer-implemented method for communicating authorized data to a destination computer system, the method comprising:
   receiving, in a data storage medium of a computer system, a data transmission including at least one data stream;
   introspecting, by a processor of the computer system, the data stream to find at least one identifier;
   matching, by the processor, the located identifier with at least one validation profile;
   retrieving, by the processor, at least one reference data set from the matched validation profile;
   parsing, by the processor, at least a portion of the data stream to extract at least one key piece of information;
   validating, by the processor, the key piece of information extracted from the data stream against the retrieved reference data sets to determine the existence of mismatched data; and
   terminating the data transmission to the destination system when validating the key piece of information extracted from the data stream against the retrieved reference determines the existence of mismatched data.

2. The method of claim 1, further comprising using the validation profile for parsing the data stream and for validating the key piece of information extracted from the data stream.

3. The method of claim 1, wherein at least one reference data set comprises an inclusion data set including allowed values.

4. The method of claim 1, wherein at least one reference data set comprises an exclusion data set including denied values.

5. The method of claim 1, further comprising terminating the data transmission to the destination system when validating the key piece of information extracted from the data stream against the retrieved reference determines the existence of a value not contained in an inclusion reference data set.

6. The method of claim 1, further comprising terminating the data transmission to the destination system when validating the key piece of information extracted from the data stream against the retrieved reference determines the existence of a value contained in an exclusion reference data set.

7. The method of claim 1, further comprising communicating a validated data file to the destination system when validating the key piece of information extracted from the data stream against the retrieved reference determines the existence of no mismatched data.

8. The method of claim 1, wherein the data stream includes at least one of personally identifiable information or healthcare information.

9. The method of claim 1, wherein the validation profile comprises one or more configurations which define how the reference data sets are to be generated.

10. The method of claim 1, further comprising generating at least one of the reference data sets independently from the data stream using one or more authoritative systems of record.

11. A computer-implemented method for communicating authorized data to a destination computer system, the method comprising:
   receiving, in a data storage medium of a computer system, a data transmission including at least one data stream;

introspecting, by a processor of the computer system, the data stream to find at least one identifier;

matching, by the processor, the located identifier with at least one validation profile;

retrieving, by the processor, at least one reference data set from the matched validation profile;

parsing, by the processor, at least a portion of the data stream to extract at least one key piece of information;

validating, by the processor, the key piece of information extracted from the data stream against the retrieved reference data sets to determine the existence of mismatched data; and terminating the data transmission to the destination system when an error condition is detected.

12. The method of claim 11, wherein the error condition comprises detecting the absence of the validation profile.

13. The method of claim 11, wherein the error condition comprises detecting an inability to introspect the data stream to find the identifier.

14. The method of claim 11, wherein the error condition comprises detecting an inability to match the located identifier with at least one validation profile.

15. The method of claim 11, wherein the error condition comprises detecting an inability to generate one or more reference data sets specified in the validation profile.

16. The method of claim 1, further comprising receiving at least one data stream by a computer system comprising a validating proxy.

17. The method of claim 1, further comprising receiving at least one data stream by a computer system comprising a validating server.

18. The method of claim 1, wherein the identifier comprises at least one of a file name or an XML tag.

19. A computer-implemented method for communicating authorized data to a destination computer system, the method comprising:

receiving, in a data storage medium of a computer system, a data transmission including at least one data stream;

introspecting, by a processor of the computer system, the data stream to find at least one identifier;

matching, by the processor, the located identifier with at least one validation profile;

retrieving, by the processor, at least one reference data set from the matched validation profile;

parsing, by the processor, at least a portion of the data stream to extract at least one key piece of information;

validating, by the processor, the key piece of information extracted from the data stream against the retrieved reference data sets to determine the existence of mismatched data;

wherein at least one reference data set comprises an inclusion data set including allowed values, and at least one reference data set comprises an exclusion data set including denied values;

terminating, by the processor, the data transmission to the destination system when validating the key piece of information extracted from the data stream against the retrieved reference determines the existence of mismatched data comprising:

a value not contained in an inclusion reference data set, or a value contained in an exclusion reference data set; and, communicating, by the processor, a validated data file to the destination system when validating the key piece of information extracted from the data stream against the retrieved reference determines the existence of no mismatched data.

* * * * *